United States Patent
Belleschi et al.

(10) Patent No.: US 11,252,783 B2
(45) Date of Patent: Feb. 15, 2022

(54) SYSTEMS AND METHODS OF COMMUNICATING BETWEEN A MAC LAYER AND A PHY LAYER FOR TRANSMISSIONS

(71) Applicant: Telefonaktiebolaget LM Ericsson (publ), Stockholm (SE)

(72) Inventors: Marco Belleschi, Solna (SE); Mattias Bergström, Sollentuna (SE); Reem Karaki, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/766,320

(22) PCT Filed: Nov. 27, 2018

(86) PCT No.: PCT/EP2018/082660
§ 371 (c)(1),
(2) Date: May 22, 2020

(87) PCT Pub. No.: WO2019/102028
PCT Pub. Date: May 31, 2019

(65) Prior Publication Data
US 2020/0367314 A1    Nov. 19, 2020

Related U.S. Application Data

(60) Provisional application No. 62/591,165, filed on Nov. 27, 2017.

(51) Int. Cl.
*H04W 80/02* (2009.01)
*H04L 1/18* (2006.01)
(Continued)

(52) U.S. Cl.
CPC ........... *H04W 80/02* (2013.01); *H04L 1/1819* (2013.01); *H04L 5/0082* (2013.01); *H04W 16/14* (2013.01)

(58) Field of Classification Search
CPC ... H04L 1/1812; H04L 1/1816; H04L 1/1896; H04L 5/001; H04L 5/0078; H04L 5/0082;
(Continued)

(56) References Cited

U.S. PATENT DOCUMENTS

| 2006/0156162 A1* | 7/2006 | Choi ...................... H04L 1/1877 |
| | | 714/748 |
| 2010/0037112 A1* | 2/2010 | Graumann ............ H04L 1/1607 |
| | | 714/748 |

(Continued)

FOREIGN PATENT DOCUMENTS

| EP | 3200514 A1 | 8/2017 |
| KR | 20030056126 A | 7/2003 |

(Continued)

OTHER PUBLICATIONS

Unknown, Author, "3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.4.0, Sep. 2017, pp. 1-108.

(Continued)

*Primary Examiner* — Pao Sinkantarakorn
(74) *Attorney, Agent, or Firm* — Murphy, Bilak & Homiller, PLLC

(57) ABSTRACT

A wireless device (300, 400), e.g., a wireless communication device (e.g., a UE) or a network node (e.g., an eNB) having a Medium Access Control (MAC) layer (410) and a physical (PHY) layer (430) configured to send/resend transmissions is presented herein. The MAC layer (410) sends transmis-
(Continued)

sions to the PHY layer (430) for transmitting, by the PHY layer (430), to a remote wireless device (300, 400). The PHY layer (430) receives the transmission from the MAC layer (410), and attempts to send the transmission. The PHY layer (430) further indicates to the MAC layer (410) whether the attempt to send the transmission, by the PHY layer (430), was successful. Responsive to the indication, the MAC layer (410) determines whether the attempt, by the PHY layer (430), to send the transmission was successful. The MAC layer (410) then selectively indicates to the PHY layer (430) whether to attempt to resend the transmission responsive to the determination. In so doing, the solution presented herein addresses problems caused by conflicting requirements for unlicensed and licensed spectrums, thus increasing throughput and saving power.

19 Claims, 20 Drawing Sheets

(51) Int. Cl.
*H04L 5/00* (2006.01)
*H04W 16/14* (2009.01)

(58) Field of Classification Search
CPC .. H04L 5/0091; H04L 27/0006; H04W 16/14; H04W 74/0808; H04W 74/0816
See application file for complete search history.

(56) References Cited

U.S. PATENT DOCUMENTS

| | | | |
|---|---|---|---|
| 2017/0318594 A1* | 11/2017 | Babaei | H04W 72/087 |
| 2018/0048498 A1* | 2/2018 | Stern-Berkowitz | H04L 5/0048 |
| 2018/0242357 A1* | 8/2018 | Khirallah | H04W 72/14 |
| 2019/0132883 A1* | 5/2019 | You | H04L 1/1896 |

FOREIGN PATENT DOCUMENTS

| | | |
|---|---|---|
| RU | 2437251 C2 | 12/2011 |
| RU | 2619068 C1 | 5/2017 |
| WO | 03030438 A1 | 4/2003 |
| WO | 2016163688 A1 | 10/2016 |

OTHER PUBLICATIONS

Unknown, Author, "HARQ with autonomous uplink access on LAA SCell", 3GPP TSG-RAN WG2 Meeting #99bis; R2-1710368; Prague, Czech Republic, Oct. 9-13, 2017, pp. 1-5.

Unknown, Author, "Overview of UL HARQ in LAA", 3GPP TSG-RAN WG2 #89bis; Tdoc R2-151504; Bratislava, Slovakia, Apr. 20-24, 2015, pp. 1-4.

"MAC Scheduling for LTE", 3GPP TSG-RAN WG2 Meeting #53, R2-061407, CATT, RITT, Shanghai, China, May 8-12, 2006, 6 pages.

\* cited by examiner

600

610 — BY A WIRELESS DEVICE HAVING A MAC LAYER AND A PHYSICAL LAYER, EXPLICITLY OR IMPLICITLY INDICATE, BY THE PHYSICAL LAYER, TO THE MAC LAYER, WHETHER THE PHYSICAL LAYER TRANSMITTED DATA THAT THE MAC LAYER SENT TO THE PHYSICAL LAYER FOR TRANSMISSION DURING THE CERTAIN TTI

611 — IN RESPONSE TO DETERMINING THAT THAT TRANSMISSION ATTEMPT WAS SUCCESSFUL, SEND, BY THE PHYSICAL LAYER, TO THE MAC LAYER, AN INDICATION THAT THE TRANSMISSION ATTEMPT WAS SUCCESSFUL

613 — IN RESPONSE TO DETERMINING THAT THAT TRANSMISSION ATTEMPT WAS SUCCESSFUL, DETERMINE NOT TO SEND TO THE MAC LAYER AN INDICATION THAT THE TRANSMISSION ATTEMPT WAS SUCCESSFUL

615 — IN RESPONSE TO DETERMINING THAT THAT TRANSMISSION ATTEMPT WAS UNSUCCESSFUL, SEND, BY THE PHYSICAL LAYER, TO THE MAC LAYER, AN INDICATION THAT THE TRANSMISSION ATTEMPT WAS UNSUCCESSFUL.

617 — IN RESPONSE TO DETERMINING THAT THAT TRANSMISSION ATTEMPT WAS UNSUCCESSFUL, DETERMINE NOT TO SEND TO THE MAC LAYER AN INDICATION THAT THE TRANSMISSION ATTEMPT WAS UNSUCCESSFUL.

619 — SEND, BY THE PHYSICAL LAYER, TO THE MAC LAYER, AN INDICATION OF A CELL ASSOCIATED WITH THE TRANSMISSION OF THE DATA, THE RECEIPT OF WHICH IMPLICITLY SIGNALS TO THE MAC LAYER AN ATTEMPTED TRANSMISSION OF THE DATA BY THE PHYSICAL LAYER

*FIG. 6*

SYSTEMS AND METHODS OF COMMUNICATING BETWEEN A MAC LAYER AND A PHY LAYER FOR TRANSMISSIONS

This application claims priority to U.S. Application No. 62/591,165, filed 27 Nov. 2017, the disclosure of which is incorporated in its entirety by reference herein.

TECHNICAL FIELD

The solution presented herein relates generally to wireless communications, and more particularly to the interaction between communication layers of a device for transmission and/or retransmission attempts.

BACKGROUND

The 3GPP work on "Licensed-Assisted Access" (LAA) intends to allow Long Term Evolution (LTE) equipment to also operate in the unlicensed radio spectrum. Candidate bands for LTE operation in the unlicensed spectrum include 5 GHz, 3.5 GHz, etc. The unlicensed spectrum is used as a complement to the licensed spectrum or allows completely standalone operation.

The LAA framework (3GPP Release 13) builds on carrier aggregation solutions introduced in Release 10 LTE to access the additional bandwidth in the unlicensed frequency bands. FIG. 1 shows an exemplary LAA framework 40, where an enhanced NodeB (eNB) uses and configures a secondary cell (SCell) 44 or an LAA carrier on the unlicensed band. The primary cell (PCell) 42 carries the more critical real-time traffic and control information to the User Equipment (UE) 30, while the LAA carrier will be used to increase the capacity for less sensitive data, e.g., best effort data.

For the case of unlicensed spectrum used as a complement to the licensed spectrum, devices connect in the licensed spectrum (primary cell or PCell) and use carrier aggregation to benefit from additional transmission capacity in the unlicensed spectrum (secondary cell or SCell). The carrier aggregation (CA) framework allows to aggregate two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations, or imposed maximum channel occupancy time. Because the unlicensed spectrum must be shared with other radios of similar or dissimilar wireless technologies, a so-called listen-before-talk (LBT) method is applied. LBT involves sensing the medium for a pre-defined minimum amount of time and backing off if the channel is busy. Due to the centralized coordination and dependency of terminal devices on the base-station (e.g., eNB) for channel access in LTE operation and imposed LBT regulations, LTE uplink (UL) performance is especially hampered. UL transmission is becoming more and more important with user-centric applications and the need for pushing data to cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike the case in LTE, Wi-Fi terminals can asynchronously access the medium and thus show better UL performance characteristics especially in congested network conditions.

There thus remains a need for solutions that control how wireless devices handle retransmissions, particularly in light of LBT or other situations requiring a determination of whether an unlicensed spectrum is available before attempting transmissions.

SUMMARY

The solution presented herein provides a solution for sending and/or resending transmissions by a wireless device, e.g., a wireless communication device (e.g., a UE) or a network node (e.g., an eNB) having a Medium Access Control (MAC) layer and a physical (PHY) layer. The MAC layer sends transmissions to the PHY layer for transmitting, by the PHY layer, to a remote wireless device. The PHY layer receives the transmission from the MAC layer, and attempts to send the transmission. The PHY layer further indicates to the MAC layer whether the attempt to send the transmission, by the PHY layer, was successful. Responsive to the indication, the MAC layer determines whether the attempt, by the PHY layer, to send the transmission was successful. The MAC layer then selectively indicates to the PHY layer whether to attempt to resend the transmission responsive to the determination. In some embodiments, the transmission comprises data, e.g., a packet data unit (PDU). In some embodiments, the transmission is related to a Transport Block (TB), a Hybrid Automatic Repeat reQuest (HARQ) process, etc. In so doing, the solution presented herein avoids the problems discussed herein associated with how a wireless device should handle circumstances requiring the determination of whether unlicensed resources are available (e.g., LBT), as well as addressing which layer should be responsible for deciding and/or implementing any necessary retransmissions. The solution presented herein therefore increases throughput (because the MAC layer can reschedule transmissions immediately), and also provides power gains (because the MAC will reschedule transmissions only when needed.

It will be appreciated that the solution presented herein may be implemented by any wireless device having a MAC layer and a PHY layer, including but not limited to wireless communication devices, e.g., wireless terminals, UEs, cellphones, etc., and network nodes, e.g., base stations, NBs, eNBs, etc.

One exemplary embodiment comprises a method performed by a wireless communication device or node having a MAC layer and a PHY layer, the method implemented by the PHY layer and comprising receiving a transmission from the MAC layer, attempting to send the transmission to a remote wireless communication device or node, and indicating to the MAC layer whether the attempt to send the transmission was successful.

According to one exemplary embodiment, the indication from the PHY layer is implicit, e.g., implied by some other message or by the absence of a message from the PHY layer.

According to one exemplary embodiment, the indication from the PHY layer is explicit, e.g., part of a signal sent by the PHY layer to the MAC layer.

One exemplary embodiment comprises a wireless communication device or node comprising a MAC layer and a PHY layer operatively connected to the MAC layer. The PHY layer is configured to receive a transmission from the MAC layer, attempt to send the transmission to a remote wireless communication device or node, and indicate to the MAC layer whether the attempt to send the transmission was successful.

One exemplary embodiment comprises a wireless communication device or node comprising a MAC layer and a PHY layer operatively connected to the MAC layer. The wireless communication device or node comprises processing circuitry and power supply circuitry. The processing circuitry is configured to receive a transmission from the MAC layer, attempt to send the transmission to a remote wireless communication device or node, and indicate to the MAC layer whether the attempt to send the transmission was successful. The power supply circuitry is configured to supply power to the wireless device.

One exemplary embodiment comprises a computer program product for controlling a wireless communication device or node comprising a MAC layer and a PHY layer. The computer program product comprises software instructions which, when executed by at least one processing circuit in the wireless communication device or node, causes the PHY layer of the wireless communication device or node to receive a transmission from the MAC layer, attempt to send the transmission to a remote wireless communication device or node, and indicate to the MAC layer whether the attempt to send the transmission was successful.

One exemplary embodiment comprises a method performed by a wireless communication device or node having a MAC layer and a PHY layer. The method is implemented by the MAC layer and comprises delivering a transmission to the PHY layer for sending to a remote wireless communication device or node, determining whether an attempt to send the transmission by the PHY layer was successful responsive to an indication from the PHY layer, and selectively indicating to the PHY layer whether to attempt to resend the transmission responsive to the determination of whether the attempt to send the transmission by the PHY layer was successful.

According to one embodiment the indication from the PHY layer is implicit and the selective indicating from the MAC layer is also implicit.

According to one embodiment the indication from the PHY layer is implicit and the selective indicating from the MAC layer is explicit.

According to one embodiment the indication from the PHY layer is explicit and the selective indicating from the MAC layer is implicit.

According to one embodiment the indication from the PHY layer is explicit and the selective indicating from the MAC layer is also explicit.

One exemplary embodiment comprises a wireless communication device or node comprising a PHY layer and a MAC layer operatively connected to the PHY layer. The MAC layer is configured to deliver a transmission to the PHY layer for sending to a remote wireless communication device or node, determine whether an attempt to send the transmission by the PHY layer was successful responsive to an indication from the PHY layer, and selectively indicate to the PHY layer whether to attempt to resend the transmission responsive to the determination of whether the attempt to send the transmission by the PHY layer was successful.

One exemplary embodiment comprises a wireless communication device or node comprising a MAC layer and a PHY layer operatively connected to the MAC layer. The wireless communication device or node comprises processing circuitry and power supply circuitry. The processing circuitry is configured to deliver a transmission to the PHY layer for sending to a remote wireless communication device or node, determine whether an attempt to send the transmission by the PHY layer was successful responsive to an indication from the PHY layer, and selectively indicate to the PHY layer whether to attempt to resend the transmission responsive to the determination of whether the attempt to send the transmission by the PHY layer was successful. The power supply circuitry is configured to supply power to the wireless device.

One exemplary embodiment comprises a computer program product for controlling a wireless communication device or node comprising a MAC layer and a PHY layer. The computer program product comprises software instructions which, when executed by at least one processing circuit in the wireless communication device or node, causes the PHY layer of the wireless communication device or node to deliver a transmission to the PHY layer for sending to a remote wireless communication device or node, determine whether an attempt to send the transmission by the PHY layer was successful responsive to an indication from the PHY layer, and selectively indicate to the PHY layer whether to attempt to resend the transmission responsive to the determination of whether the attempt to send the transmission by the PHY layer was successful.

One exemplary embodiment comprises a method performed by a wireless communication device or node having a MAC layer and a PHY layer. The method comprises the MAC layer delivering a transmission to the PHY layer, the PHY layer attempting to send the transmission to a remote wireless communication device or node, the PHY layer indicating to the MAC layer whether the attempt to send the transmission by the physical layer was successful, and the MAC layer selectively indicating to the PHY layer whether to attempt to resend the transmission responsive to the indication by the PHY layer of whether the attempt to send the transmission by the PHY layer was successful.

One exemplary embodiment comprises a wireless communication device or node comprising a MAC layer and a PHY layer operatively connected to the MAC layer. The wireless communication device or node comprises processing circuitry and power supply circuitry. The processing circuitry is configured to deliver, by the MAC layer, a transmission to the PHY layer; attempt to send, by the PHY layer, the transmission to a remote wireless communication device or node; indicate, by the PHY layer to the MAC layer, whether the attempt to send the transmission by the physical layer was successful; and selectively indicate, by the MAC layer to the PHY layer, whether to attempt to resend the transmission responsive to the indication by the PHY layer of whether the attempt to send the transmission by the PHY layer was successful. The power supply circuitry is configured to supply power to the wireless device.

One exemplary embodiment comprises a computer program product for controlling a wireless communication device or node comprising a MAC layer and a PHY layer. The computer program product comprises software instructions which, when executed by at least one processing circuit in the wireless communication device or node, causes the wireless communication device or node to deliver, by the MAC layer, a transmission to the PHY layer; attempt to send, by the PHY layer, the transmission to a remote wireless communication device or node; indicate, by the PHY layer to the MAC layer, whether the attempt to send the transmission by the physical layer was successful; and selectively indicate, by the MAC layer to the PHY layer, whether to attempt to resend the transmission responsive to the indication by the PHY layer of whether the attempt to send the transmission by the PHY layer was successful.

BRIEF DESCRIPTION OF THE DRAWINGS

FIG. 6 shows another exemplary method implemented by the PHY layer.

DETAILED DESCRIPTION

Figure 1:
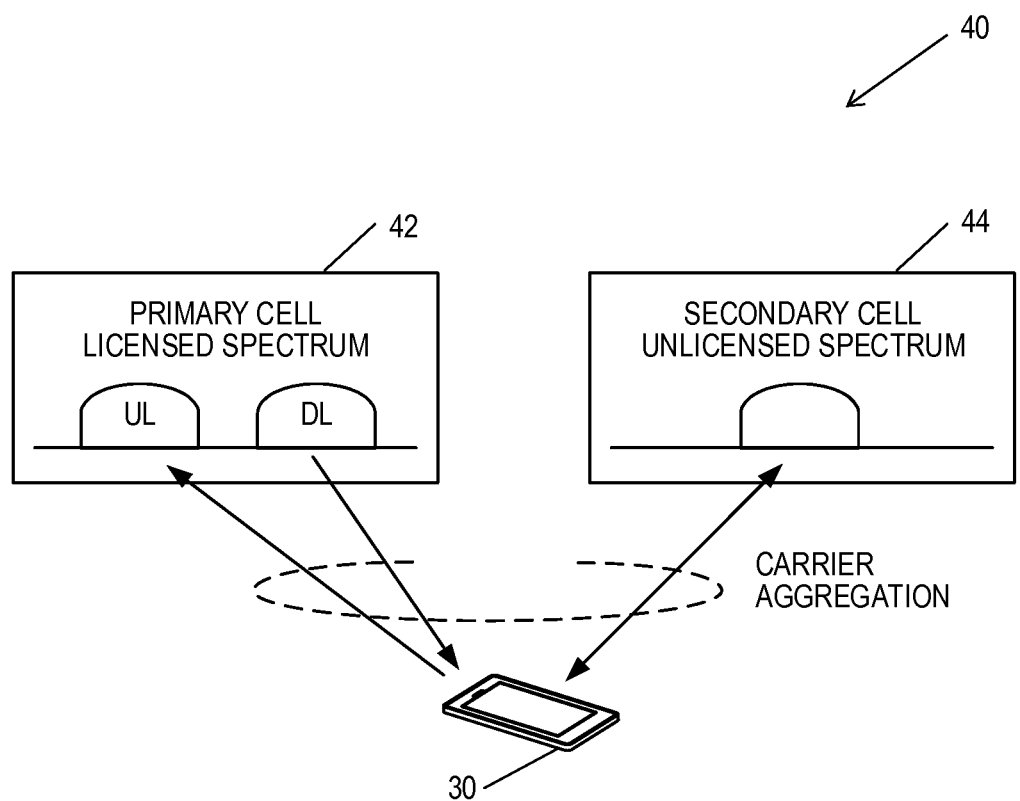
FIG. 1 shows an exemplary network utilizing licensed spectrum and unlicensed spectrum.

The solution presented herein controls how different layers of a wireless device, e.g., a wireless communication device or a network node, handle transmissions and potential retransmissions. Before getting into the details of the solution, the following first generally describes the associated systems.

In LTE the uplink access is typically controlled, i.e., scheduled, by a network node, e.g., an Evolved Universal Terrestrial Radio Access Network (E-UTRAN) NodeB (eNB). In this case the User Equipment (UE) would report to the eNB when data is available to be transmitted, e.g., by sending a scheduling request (SR) message. Based on the SR message, the eNB grants the resources and relevant information to the UE in order to carry out the transmission of a certain size of data. The assigned resources are not necessarily sufficient for the UE to transmit all the available data. Therefore, it is possible that the UE sends a buffer status report (BSR) control message in the granted resources, in order to inform the eNB about the correct size and updated size of the data waiting for transmission. Based on that, the eNB further grants the resources to carry on with the UE uplink transmission of the corrected size of data.

In more detail, every time new data arrives at the UE's empty buffer, the following exemplary procedure is performed:

1. Using the Physical Uplink Control Channel (PUCCH), the UE informs the network that it needs to transmit data by sending a Scheduling Request (SR) indicating that it needs uplink access. UE has periodic timeslots for SR transmissions (typically on a 5, 10, or 20 ms interval).
2. Once the eNB receives the SR request bit, it responds with a small "uplink grant" that is just large enough to communicate the size of the pending buffer. The reaction to this request typically takes 3 ms.
3. After the UE receives and processes (takes about 3 ms) its first uplink grant, it typically sends a Buffer Status Report (BSR) that is a Medium Access Control (MAC) layer Control Element (MAC CE) used to provide information about the amount of pending data in the uplink buffer of the UE. If the grant is big enough, the UE sends data from its buffer within this transmission as well. Whether the BSR is sent depends also on specified conditions, e.g., those specified in 3GPP TS 36.321.
4. The eNB receives the BSR message, allocates the necessary uplink resources, and sends back another uplink grant that allows the device to drain its buffer.

Adding it all up, about 16 ms (plus time to wait for a PUCCH transmission opportunity) of delay can be expected between data arrival at the empty buffer in the UE and reception of this data in the eNB.

Another scheduling option specified in LTE is the so-called semi-persistent scheduling (SPS). One or more SPS configurations can be assigned to a certain UE. Each SPS configuration addresses a set of periodically recurring resources that are to be considered as uplink grants for LTE transmissions. The eNB can (de)activate each SPS configuration via Downlink Control Information (DCI) on the Physical Downlink Control Channel (PDCCH). Once the SPS configuration is activated, the UE can use the associated resources. If an SPS configuration is deactivated, the UE should stop using the associated resources.

A key point in conventional uplink LTE scheduling is that there is a fixed one-to-one association between a Transmission Time Interval (TTI) and a Hybrid Automatic Repeat reQuest (HARQ) Identifier (ID). In this way, the eNB has full control of the status of the different HARQ processes. It will be appreciated that while aspects of the solution presented herein are described in terms of TTIs, these aspects apply to any time interval, including but not limited to a TTI, subframe, slot, symbol, etc.

Typically, the spectrum used by LTE is dedicated to LTE. This dedicated allocation has the advantage that an LTE system does not need to care about coexistence issues and the spectrum efficiency can be maximized. However, the limited spectrum allocated to LTE cannot meet the ever increasing demand for larger throughput from applications/services. Therefore, Rel-13 LAA extended LTE to exploit unlicensed spectrum(s) in addition to the licensed spectrum. Unlicensed spectrum(s) can, by definition, be simultaneously used by multiple different technologies, which requires LTE needs to consider the coexistence issue with other systems, e.g., IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to transmit essential control signals and channels on a licensed carrier. For example, as shown in the exemplary wireless communication network 40 of FIG. 1, a UE 30 is connected to a Primary Cell (PCell) 42 in the licensed spectrum/band and one or more Secondary Cells (SCells) 44 in the unlicensed spectrum/band. For the solution presented herein, we denote a secondary cell in unlicensed spectrum as licensed-assisted access secondary cell (LAA SCell). In the case of standalone operation as in MulteFire, no licensed cell is available for uplink control signal transmissions.

For LAA, asynchronous HARQ is recommended for LAA UL (e.g., Physical Uplink Shared Channel (PUSCH)). That means UL retransmissions may not only occur one Round Trip Time (RTT), e.g., n+8, after the initial transmission, but rather may occur at any point in time. This is considered beneficial in particular when retransmissions are blocked and postponed due to LBT. When introducing asynchronous HARQ, the UE should therefore assume that all transmitted UL HARQ processes were successful (set local status to ACK). The UE performs a HARQ retransmission for a HARQ process only upon reception of a corresponding UL Grant (New Data Indicator (NDI) not toggled) from the eNB.

For downlink (DL) HARQ, after reception of the PDCCH/EPDCCH (enhanced PDCCH) and associated Physical Downlink Shared Channel (PDSCH) in subframe 'n', the UE has the associated HARQ feedback ready for transmission in subframe 'n+4.' The UE transmits any pending HARQ feedback at the earliest possible uplink transmission opportunity following the 'n+4' constraint. The uplink transmission opportunity is defined as a layer-1 control signaling resource (e.g., PUCCH) being available for the UE. When transmitting the HARQ feedback associated with the PDSCH, the UE collects pending feedback. The pending HARQ feedback may potentially include feedback for several downlink transmissions. The pending HARQ feedback is collected in a bitmap with an implicit association between the index in the bitmap and the HARQ process ID. The size of this bitmap is configurable by the eNB. The maximum number of HARQ processes for DL operation is 16. When signaled in a bitmap conveyed via layer-1 control signaling, the default status of an HARQ-ID packet is NACK unless there is an ACK available to be sent.

For uplink (UL) HARQ, asynchronous UL HARQ operations were introduced in LTE Rel-13 for enhanced Machine-Type Communication (eMTC). There is no support for non-adaptive HARQ operation, and the UE shall ignore any information content on the Physical Hybrid-ARQ Indicator Channel (PHICH) resources with respect to HARQ operation. The PHICH resources are maintained as part of the downlink transmission resources, but the information content is reserved for future use. Any uplink transmission (new transmission or retransmission) is scheduled through UL grant through PDCCH/EPDCCH. However, also in this type of asynchronous mechanism there is still a relationship between the HARQ IDs and the time intervals, so that the eNB control is still fully possible to some extent. Also, to perform a retransmission, the UE has to wait for an explicit UL grant provided by the network. In particular, the eNB may request a retransmission for a certain HARQ process by not toggling the NDI bit for that HARQ process. The eNB may send the PDCCH to trigger a retransmission of an HARQ process at the expiry of the HARQ RTT associated to that HARQ process or (if configured) at any Discontinuous Reception (DRX) occasion in which the UE is supposed to monitor the DL channel. For example, in Rel. 14, the eNB has the possibility to configure a DRX retransmission timer (e.g., drx-ULRetransmissionTimer), which is triggered at expiry of the HARQ RTT. This timer allows the eNB to better counteract possible LBT occurrences which may prevent the eNB from correctly delivering the PDCCH as soon as possible after HARQ RTT expiry.

Regarding unscheduled UL for LAA/MulteFire, the usage of autonomous uplink access (AUL) for LAA is considered within the umbrella of 3GPP Rel. 15, as well as in the MultiFire standardization body.

For LTE UL channel access, both the UE and the eNB need to determine whether an unlicensed spectrum is available before attempting transmissions, e.g., by performing LBT operations corresponding to the scheduling request, scheduling grant, and data transmission phases. In contrast, Wi-Fi terminals only need to perform LBT once in the UL data transmission phase. Moreover, Wi-Fi terminals can asynchronously send data compared to the synchronized LTE system. Thus, Wi-Fi terminals have a natural advantage over LTE terminals in UL data transmission, and show superior performance in collocated deployment scenarios as seen in our simulation studies. Overall study results show that Wi-Fi has a better uplink performance than LTE particularly in low-load or less congested network conditions. As the network congestion or load is increased, the LTE channel access mechanism (TDMA type) becomes more efficient, but Wi-Fi uplink performance is still superior. For example, a UE can start the UL transmission without waiting for permission from the eNB. In other words, a UE can perform LBT to gain UL channel access whenever the UL data arrives without transmitting an SR or having an UL grant from the eNB. The UE can use autonomous mode for the whole data transmission or alternatively, the UE can transmit using autonomous mode for first N transmission bursts and then switch back to the eNB controlled scheduling mode.

Autonomous uplink access (AUL) can be simply represented by a semi-persistent scheduling (SPS) configuration where uplink grant periodically recurs following a certain periodic interval. Compared with the legacy LTE SPS, the difference would be that in AUL it would be up to the UE implementation when to perform (re)transmission of a certain HARQ process, and under certain conditions also whether to perform a new transmission or a retransmission. On the other hand, in the legacy LTE SPS, each TTI is associated to a certain HARQ process that the UE has to transmit when performing UL transmission on such TTI. Similarly, whether to perform a transmission or retransmission follows a network indication (e.g. ACK/NACK on PHICH or PDCCH NDI indication). This implies that in AUL, the UE needs to signal to the eNB (e.g., in the Uplink Control Information (UCI)) to which HARQ process, the data transmitted on a certain PUSCH refer to.

In LTE, the Medium Access Control (MAC) layer in the uplink is responsible for filling the UL grant indicated by the eNB (or (pre)configured) with the UL data available in the UL buffer, and for delivering data to the physical (PHY) layer. In turn, the PHY layer is responsible for coding, modulation, multi-antenna processing, and mapping of the data indicated by the MAC layer to the time/frequency resources indicated in the UL grant.

In LAA, the PHY layer is also responsible for the LBT. Therefore, the MAC layer is not aware of whether the data that are delivered to the PHY layer are successfully transmitted. Depending, on the outcome of the LBT, some data may be transmitted right away, e.g., in the same TTI in which the MAC layer delivered data to the PHY layer, or not. In the latter case, in LAA, the eNB will not receive any UL transmission and thus may reschedule a retransmission at a later point in time, so that the MAC layer can trigger a retransmission.

However, in AUL, the eNB might not send any dynamic grant to schedule a retransmission, because for AUL, (re) transmission should be autonomously scheduled by the UE. In other words, LBT procedures impact MAC layer procedures because the MAC layer may trigger retransmissions depending on whether the LBT is successful or whether the LBT is unsuccessful. Because LBT procedures are performed, however, by the PHY layer, the MAC layer is unaware of the outcome of the LBT procedure. Therefore, it remains a problem of how the UE should handle LBT events and which layer should take care of retransmissions.

According to embodiments of the solution presented herein, the MAC and PHY layers of a wireless communication device or network node interact to determine whether transmissions by the PHY layer 215 to a remote wireless communication device or network node were successful. For example, from the MAC layer's perspective, the MAC layer delivers a transmission to the PHY layer for sending to a remote wireless communication device or node, determines whether an attempt to send the transmission by the PHY layer was successful responsive to an implicit or explicit indication from the PHY layer, and selectively indicates (implicitly or explicitly) to the PHY layer whether to attempt to resend the transmission responsive to the determination of whether the attempt to send the transmission by the PHY layer was successful. From the PHY layer's perspective, after the PHY layer receives a transmission from the MAC layer, the PHY layer attempts to send the transmission to the remote wireless communication device or node, and indicates to the MAC layer (implicitly or explicitly) whether the attempt to send the transmission was successful. In some embodiments, the transmission comprises data, e.g., a packet data unit (PDU). In some embodiments, the transmission is related to a Transport Block (TB), a Hybrid Automatic Repeat reQuest (HARQ) process, etc. In so doing, the solution presented herein enables the MAC layer to be aware of the LBT outcome, and thus to adjust scheduling operations depending on the LBT outcome. The MAC layer can thus reschedule a retransmission immediately when needed, e.g., if the LBT is not successful, which increases throughput. Further, because the MAC layer only schedules retransmissions when the LBT is unsuccessful, rather than blindly, the solution presented herein also provides power savings.

Figure 2:
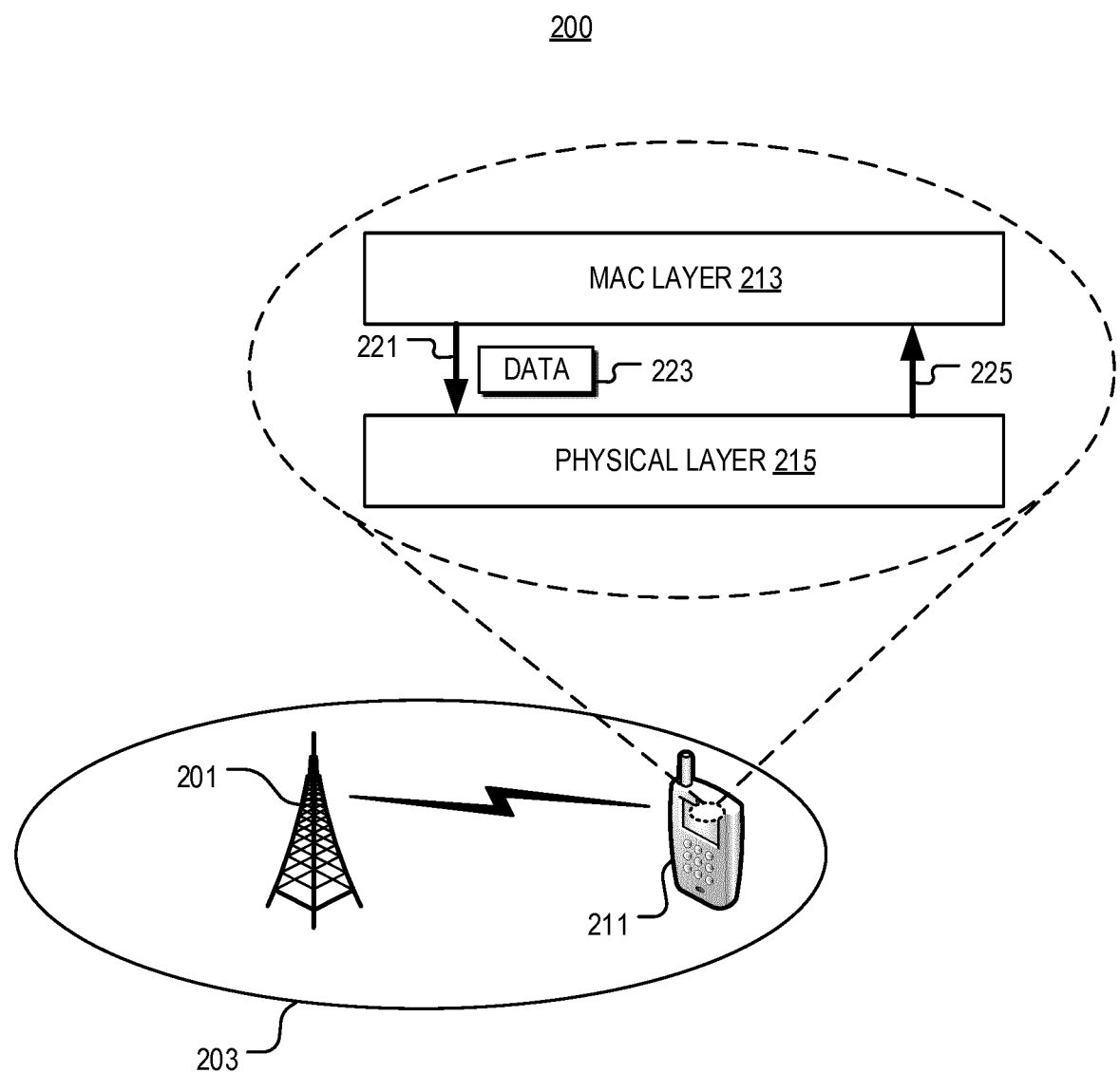
FIG. 2 shows an exemplary embodiment of a wireless system comprising a network node and a wireless communication device.

FIG. 2 shows one embodiment of a system 200 of communicating between a medium access control layer 213 and a physical layer 215 for data transmissions in accordance with various aspects of the solution presented herein. In FIG. 2, system 200 may include a network node 201 (e.g., base station, eNB) and a wireless device 211 (e.g., UE). In one embodiment, the network node 201 may be associated with cell 203. Further, a cell may be a carrier in a sector of a base station. The wireless device 211 includes a MAC layer 213 and a physical layer 215. The MAC layer 213 performs functions such as mapping between logical channels and transport channels, multiplexing of MAC SDUs from one or different logical channels onto TBs to be delivered to the physical layer on transport channels, demultiplexing of MAC SDUs from one or different logical channels from TBs delivered from the physical layer on the transport channels, transmit and receive HARQ operation, logical channel prioritization, and the like. The physical layer 215 performs functions such as coding/decoding, modulation/demodulation, multi-antenna mapping, and the like.

In one embodiment, the MAC layer 213 may send, to the physical layer 215 a request 221 to transmit data 223 during a certain TTI. Further, the MAC layer 213 delivers, to the physical layer 215, the data 223 to be transmitted during the certain TTI. The physical layer 215 may receive the request 221 and the transmit data 223 from the MAC layer 213. The physical layer 215 may attempt transmission of the data 223 during the certain TTI. Further, the physical layer 215 may determine whether this transmission attempt is successful or unsuccessful. In response, the physical layer 215 explicitly signals 225 or implicitly signals to the MAC layer 213 whether the data 223 was transmitted during the certain TTI. The MAC layer 213 receives the explicit signaling 225 or determines the implicit signaling by the physical layer 215 of whether the physical layer 215 transmitted the data 223 during the certain TTI. While FIG. 2 shows an example of the solution presented herein as performed by a wireless communication device 211 sending transmissions to a remote network node 201, it will be appreciated that the solution applies equally to a network node 201, having a MAC layer 213 and a PHY layer 215, sending transmissions to a remote wireless communication device 211.

In FIG. 2, the network node 201 may be configured to support one or more communication systems such as LTE, UMTS, GSM, NB-IoT, 5G New Radio (NR), the like, or any combination thereof. Further, the network node 201 may be a base station, an access point, or the like. Also, the network node may serve wireless device 211. The wireless device 211 may be configured to support one or more communication systems such as LTE, UMTS, GSM, NB-IoT, 5G NR, the like, or any combination thereof. The techniques described herein while directed to a wireless device may also be directed to a network node as such network node also includes a MAC layer and a physical layer.

Note that the apparatuses described herein may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 3:
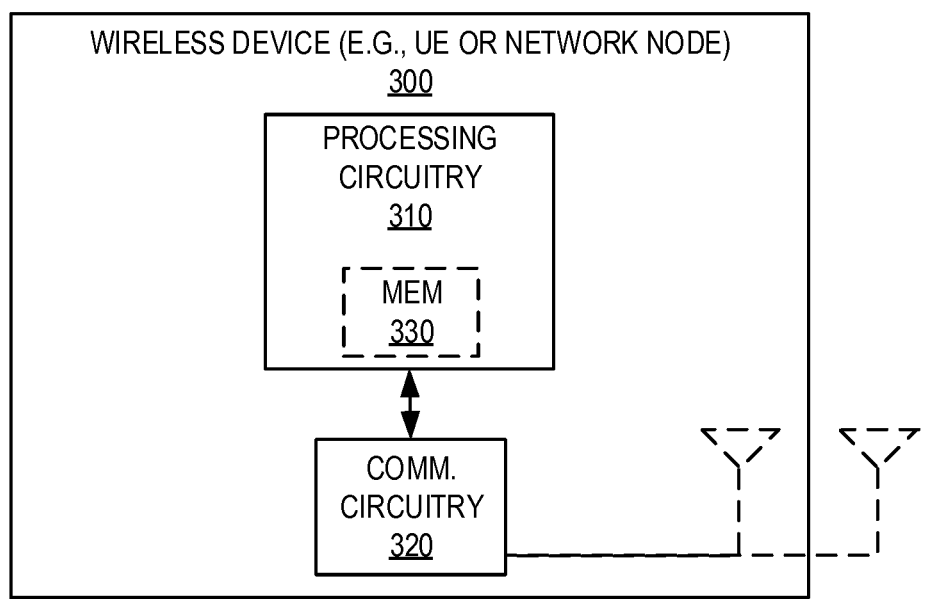
FIG. 3 shows a block diagram for an exemplary wireless device, e.g., a wireless communication device or a network node, according to one exemplary embodiment.

For example, FIG. 3 shows one embodiment of a wireless device 300 in accordance with various embodiments described herein. As shown, the wireless device 300 includes processing circuitry 310 and communication circuitry 320. The communication circuitry 320 (e.g., radio circuitry) is configured to transmit and/or receive information to and/or from one or more other nodes, e.g., via any communication technology. Such communication may occur via one or more antennas that are either internal or external to the wireless device 300. The processing circuitry 310 is configured to perform processing described above, e.g., in FIG. 2, such as by executing instructions stored in memory 330. The processing circuitry 310 in this regard may implement certain functional means, units, or modules.

Figure 4:
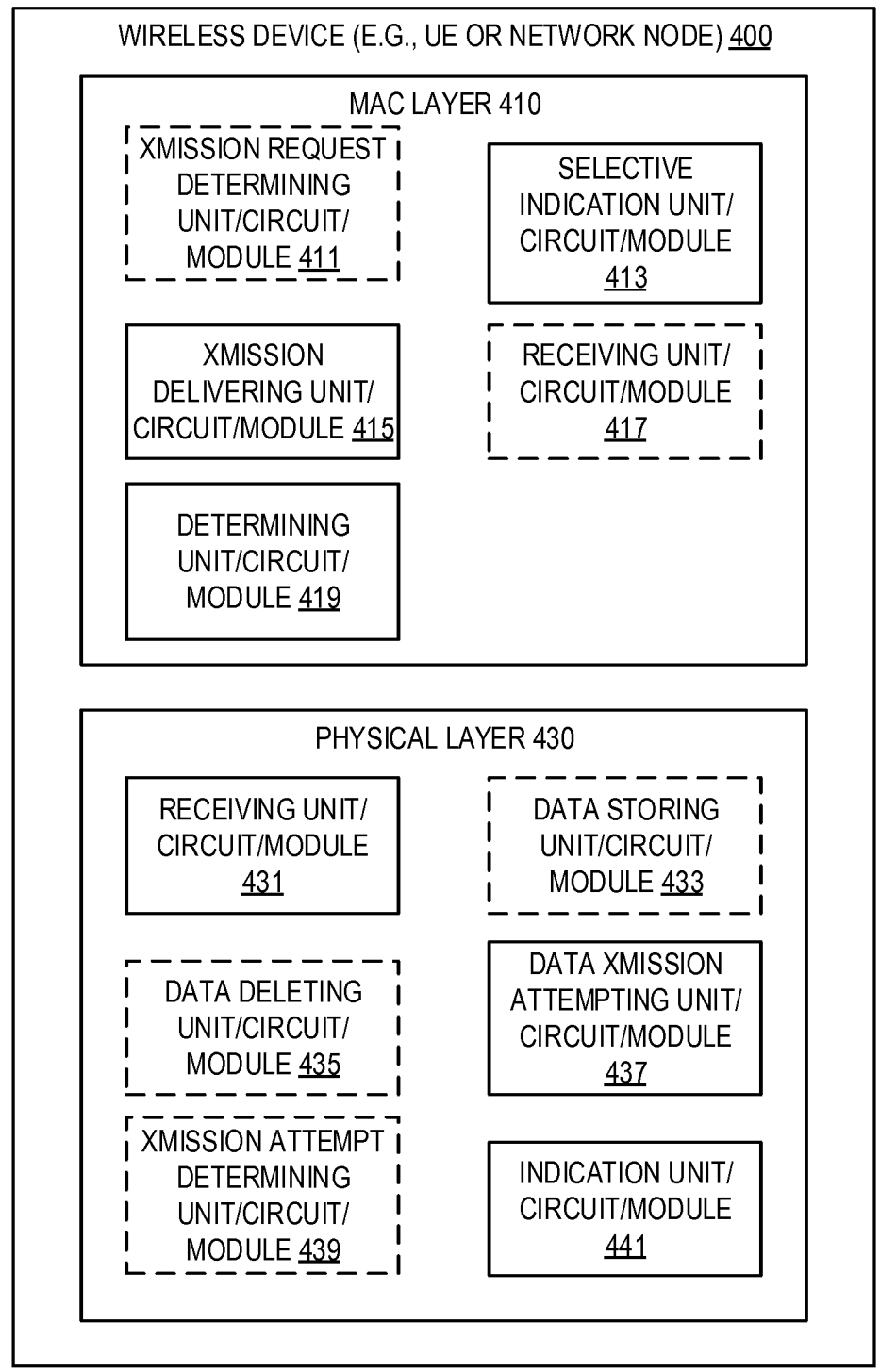
FIG. 4 shows a block diagram for an exemplary wireless device, e.g., a wireless communication device or a network node, according to one exemplary embodiment.
Figure 10:
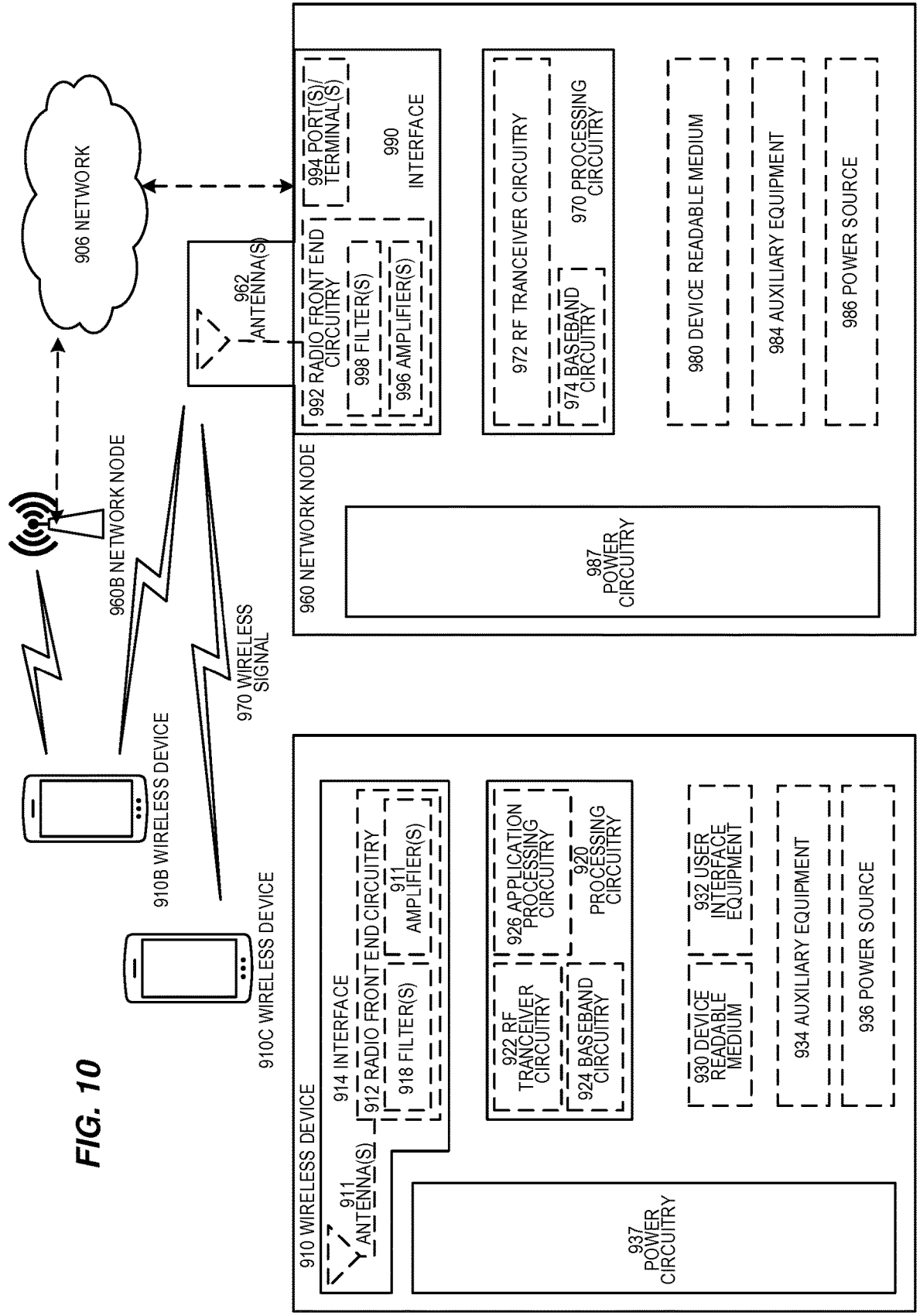
FIG. 10 shows an exemplary wireless network applicable to the solution presented herein.

FIG. 4 shows a schematic block diagram of one embodiment of a wireless device 400 in accordance various embodiments described herein (for example, the wireless network shown in FIG. 2 and FIG. 10). As noted herein, the solution applies to any wireless device 400 having a MAC layer 410 and a PHY layer 430, including but not limited to UEs and network nodes. As shown in FIG. 4, wireless device 400 implements various functional means, units, or modules (e.g., via the processing circuitry 310 in FIG. 3 and/or via software code) for a MAC layer 410 and a physical layer 430. Generally, the MAC layer 410 of the wireless device 400 comprises a selective indication unit/circuit/module 413, a transmission delivering unit/circuit/module 415, and a determining unit/circuit/module 419, as well as an optional transmission request determining unit/circuit/module 411 and an optional receiving unit/circuit/module 417. Further, the PHY layer 430 generally comprises a receiving unit/circuit/module 431, a data transmission attempting unit/circuit/module 437, and an indication unit/circuit/module 441, as well as an optional data storing unit/circuit/module 433, an optional data deleting unit/circuit/module 435, and an optional data transmission attempt determining unit/circuit/module 439. In one exemplary embodiment, the transmission delivering unit/circuit/module 415 of the MAC layer 410 delivers a transmission to the PHY layer for sending to a remote wireless device, and the receiving unit/circuit/module 431 of the PHY layer receives the transmission from the MAC layer. The data transmission attempting unit/circuit/module 437 attempts to send the transmission to a remote wireless device. The indication unit/circuit/ module 441 indicates to the MAC layer 410 whether the attempt to send the transmission was successful. The determining unit/circuit/module 419 of the MAC layer 410 determines whether an attempt to send the transmission by the PHY layer 430 was successful responsive to the indication from the PHY layer 430. The selective indication unit/circuit/module 413 selectively indicates to the PHY layer 430 whether to attempt to resend the transmission responsive to the determination (by the determining unit/ circuit/module 419) whether the attempt to send the transmission by the PHY layer 430 was successful.

In another embodiment, where the transmission comprises data, the transmission request determining unit 411 in the MAC layer 410 determines whether to request to send the data by the PHY layer 430 during a certain TTI, while the transmission delivering unit 415 sends to the PHY layer 430 a request to send the data during the certain TTI or an indication of a cell associated with the transmission of the data during the certain TTI, and delivers to the PHY layer 430 the data to send during the certain TTI. The determining unit/circuit/module 419 determines whether the attempt to send the data by the PHY layer 430 was successful responsive to an indication by the PHY layer 430. For example, the receiving unit 417 of the MAC layer 410 may receive an explicit indication, e.g., signaling, from the PHY layer 430 of whether the PHY layer 430 successfully sent the data during the certain TTI. Alternatively, the determining unit/ circuit/module 419 may make the determination responsive to an implicit indication.

For this embodiment, the receiving unit/circuit/module 431 of the PHY layer 430 receives from the MAC layer 410 the data (and optionally, a request to send the data during a certain TTI or an indication of a cell associated with the transmission of the data), and a data storing unit/circuit/ module 433 stores in memory the data received from the MAC layer 410. The data deleting unit/circuit/module 435 deletes or allows the deletion of the data stored in memory, while the data transmission attempting unit/circuit/module 437 attempts the transmission of the data during the certain TTI. The transmission attempt determining unit/circuit/module 439 determines whether the transmission attempt is successful or unsuccessful, and the indication unit/circuit/ module 441 explicitly or implicitly indicates to the MAC layer 410 whether the PHY layer 430 successfully transmitted data that the MAC layer 410 sent to the PHY layer 430 for transmission during the certain TTI.

Figure 5A:
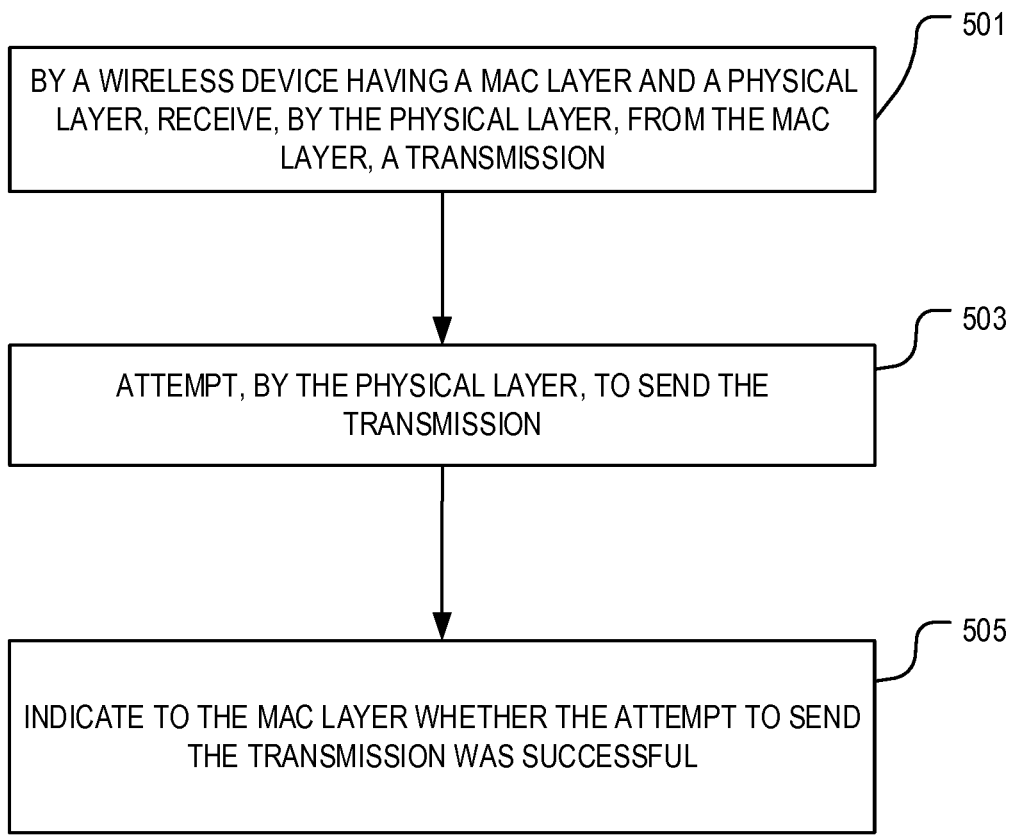
FIG. 5A shows an exemplary method implemented by the PHY layer.

FIG. 5A shows one exemplary general method 500 performed by the PHY layer 430 of a wireless device 400, e.g., a wireless communication device 211 or a network node 201, of communicating between a MAC layer 410 and the PHY layer 430 for sending transmissions in accordance with various embodiments described herein. As shown in FIG. 5A, the PHY layer 430 receives a transmission from the MAC layer 410 (block 501), and attempts to send the received transmission to a remote wireless device (block 503). The PHY layer 430 then indicates (explicitly or implicitly) to the MAC layer 410 whether the attempt to send the transmission by the PHY layer 430 was successful (block 505).

Figure 5B:
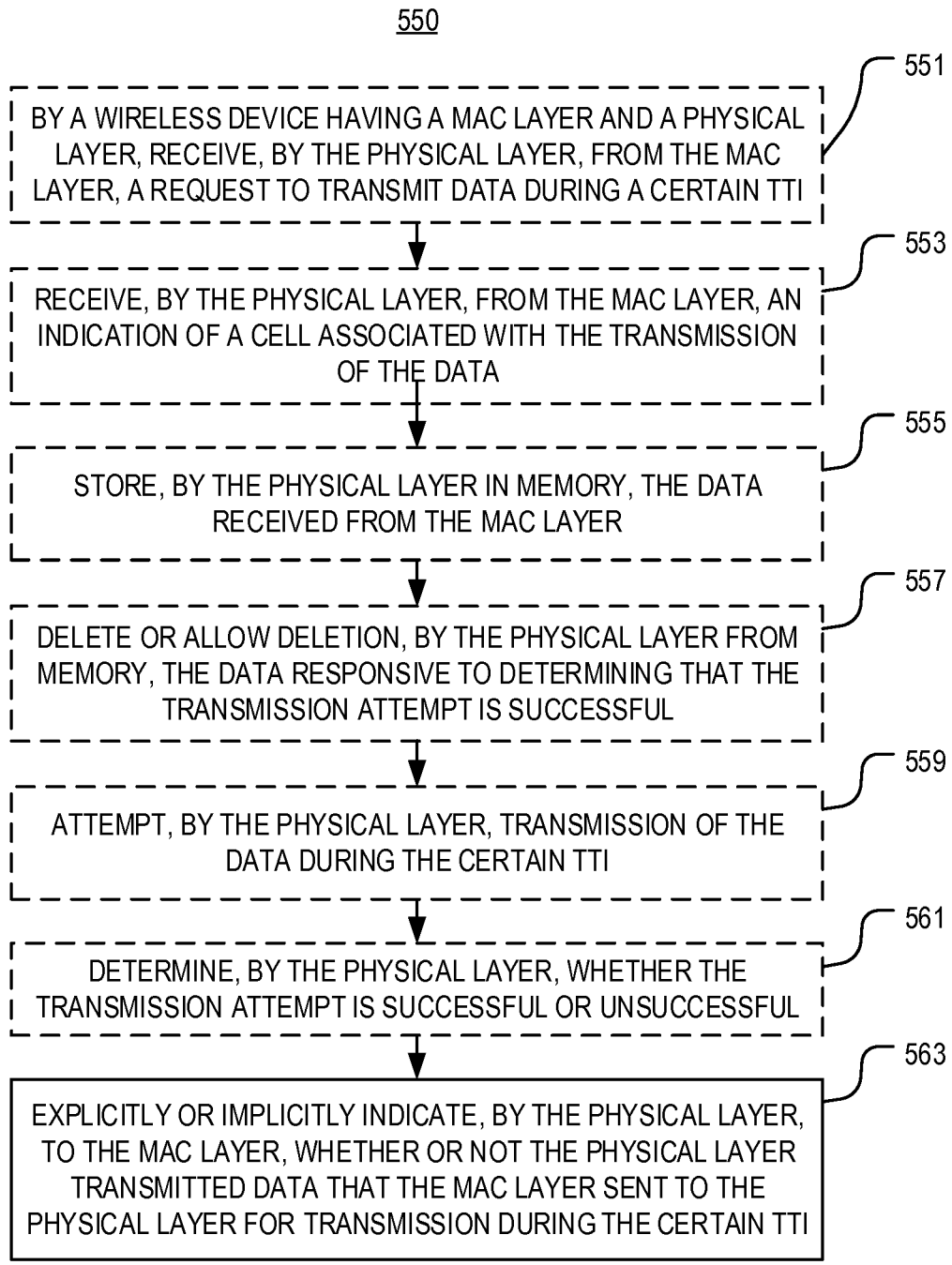
FIG. 5B shows another exemplary method implemented by the PHY layer.

FIG. 5B shows a more detailed exemplary method 550 performed by the PHY layer 430. The PHY layer 430 receives from the MAC layer 410, a request to transmit data during a certain TTI (block 551) and an indication of a cell associated with the transmission of the data (block 553). The PHY layer 430 stores the received data in memory (block 555), and deletes or allows deletion, from the memory, the data responsive to the PHY layer 430 determining that the transmission attempt was successful (block 557). The PHY layer 430 attempts to transmit the data during the certain TTI (block 559), and determines whether the transmission attempt was successful or unsuccessful (block 561). The PHY layer 430 explicitly or implicitly indicates to the MAC layer 410 whether the PHY layer 430 successfully or unsuccessfully transmitted the data during the certain TTI (block 563).

FIG. 6 shows another embodiment of a method 600 performed by the PHY layer 430 of a wireless device 400, e.g., a wireless communication device 211 or a network node 201, of communicating between a MAC layer 410 and the PHY layer 430 for data transmissions in accordance with various embodiments described herein. In particular, method 600 of FIG. 6 corresponds to block 505 of FIG. 5A and/or block 563 of FIG. 5B. As shown in FIG. 6, the PHY layer 430 explicitly or implicitly indicates to the MAC layer 410 whether the PHY layer 430 transmitted data that the MAC layer 410 sent to the PHY layer 430 for transmission during a certain TTI (block 610). In one embodiment, in response to determining that the transmission attempt was successful, the PHY layer 430 sends an indication that the transmission attempt was successful to the MAC layer 410 (block 611) or determines not to send an indication that the transmission attempt was successful to the MAC layer 410 (block 613). In another embodiment, in response to determining that the transmission attempt was unsuccessful, the PHY layer 430 sends an indication that the transmission attempt was unsuccessful to the MAC layer 410 (block 615) or determines not to send an indication that the transmission attempt was unsuccessful to the MAC layer 410 (block 617). In another embodiment, the PHY layer 430 sends to the MAC layer 410 an indication of a cell associated with the transmission of the data, the receipt of which implicitly implies to the MAC layer 410 of an attempted transmission of the data by the PHY layer 430 (block 619).

Figure 7A:
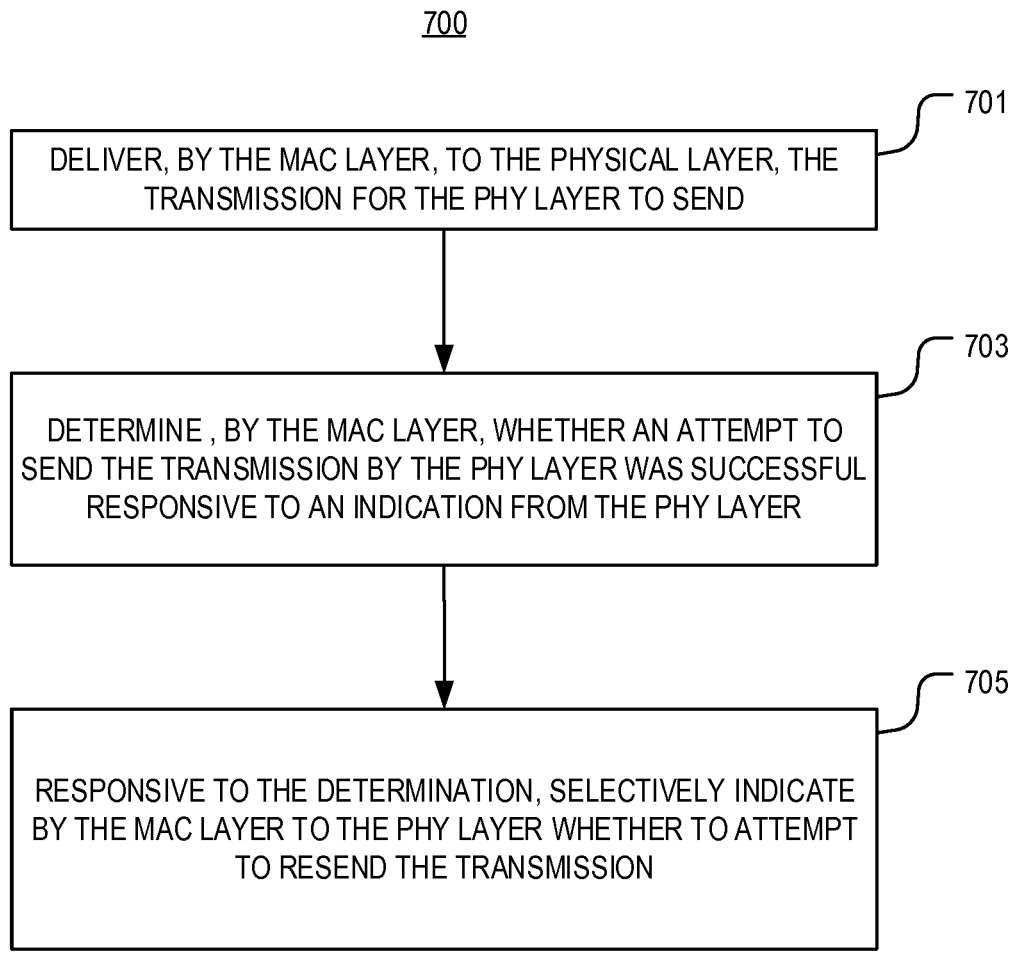
FIG. 7A shows an exemplary method implemented by the MAC layer.

FIG. 7A shows one exemplary general method 700 performed by the MAC layer 410 of a wireless device 400, e.g., a wireless communication device 211 or a network node 201, of communicating between the MAC layer 410 and a PHY layer 430 for sending transmissions in accordance with various embodiments described herein. As shown in FIG. 7A, the MAC layer 410 delivers a transmission to the PHY layer 430 for sending to a remote wireless device (block 701. The MAC layer 410 further determines whether an attempt to send the transmission by the PHY layer 430 was successful responsive to an indication from the PHY layer 430 (block 703). Responsive to the determination of whether the an attempt to send the transmission by the PHY layer 430 was successful, the MAC layer 410 selectively indicates to the PHY layer 430 whether to attempt to resend the transmission (block 705).

Figure 7B:
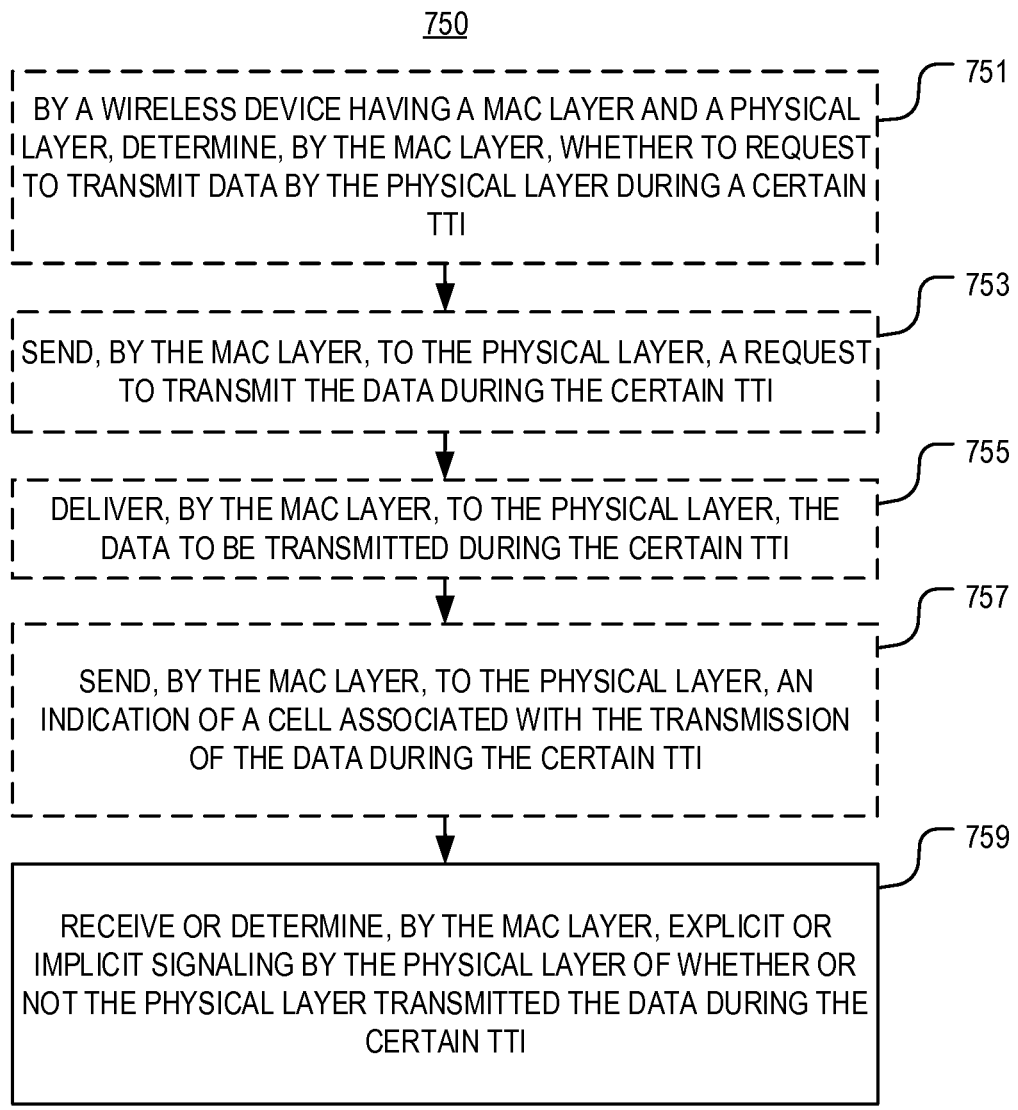
FIG. 7B shows another exemplary method implemented by the MAC layer.

FIG. 7B shows a more detailed exemplary method 750 performed by the MAC layer 410. The MAC layer 410 determines whether to request to transmit data by the PHY layer 430 during a certain TTI (block 751), and sends to the PHY layer 430 a request to transmit the data during the certain TTI (block 753). The MAC layer 410 then delivers the data to be transmitted during the certain TTI to the PHY layer 430 (block 755). The MAC layer 410 may also send an indication of a cell associated with the transmission of the data during the certain TTI to the PHY layer 430 (block 757). The MAC layer 410 then receives or determines explicit or implicit signaling by the PHY layer 430 of whether the PHY layer successful (or optionally unsuccessfully) transmitted the data during the certain TTI (block 759).

Figure 8:
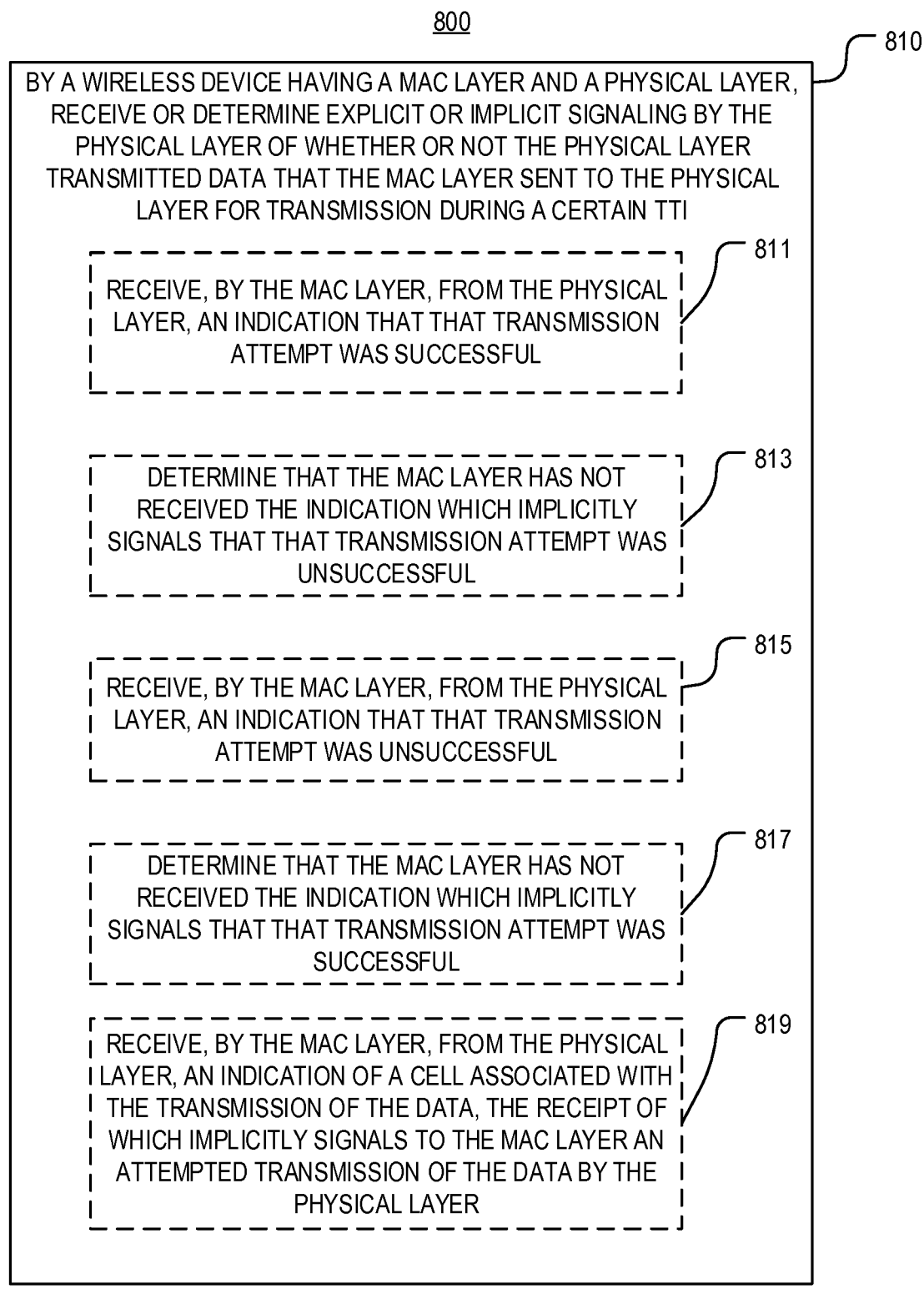
FIG. 8 shows another exemplary method implemented by the MAC layer.

FIG. 8 shows another embodiment of a method 600 performed by the MAC layer 410 of a wireless device 400, e.g., a wireless communication device 211 or a network node 201, of communicating between the MAC layer 410 and a PHY layer 430 for data transmissions in accordance with various embodiments described herein. In particular, method 800 of FIG. 8 corresponds to block 703 of FIG. 7A and/or block 759 of FIG. 7B. As shown in FIG. 8, the MAC layer 410 receives or determines explicit or implicit signaling by the PHY layer 430 of whether the PHY layer 430 successfully (or unsuccessfully) transmitted the data the MAC layer 410 sent to the PHY layer 410 for transmission during the certain TTI (block 810). In one embodiment, the MAC layer 410 does this by receiving, from the PHY layer 430, an indication that the transmission attempt was successful (block 811). In another embodiment, the MAC layer 410 determines that no indication was received, which implicitly indicates that the transmission attempt was unsuccessful (block 813). In another embodiment, the MAC layer 410 receives, from the PHY layer 430, an indication that the transmission attempt was unsuccessful (block 815). In another embodiment, the MAC layer 410 determines that no indication was received, which implicitly indicates that the transmission attempt was successful (block 817). In another embodiment, the MAC layer 410 receives, from the PHY layer 430, an indication of a cell associated with the transmission of the data, the receipt of which implicitly signals to the MAC layer 410 an attempted transmission of the data by the PHY layer 430 (block 819).

Figure 9:
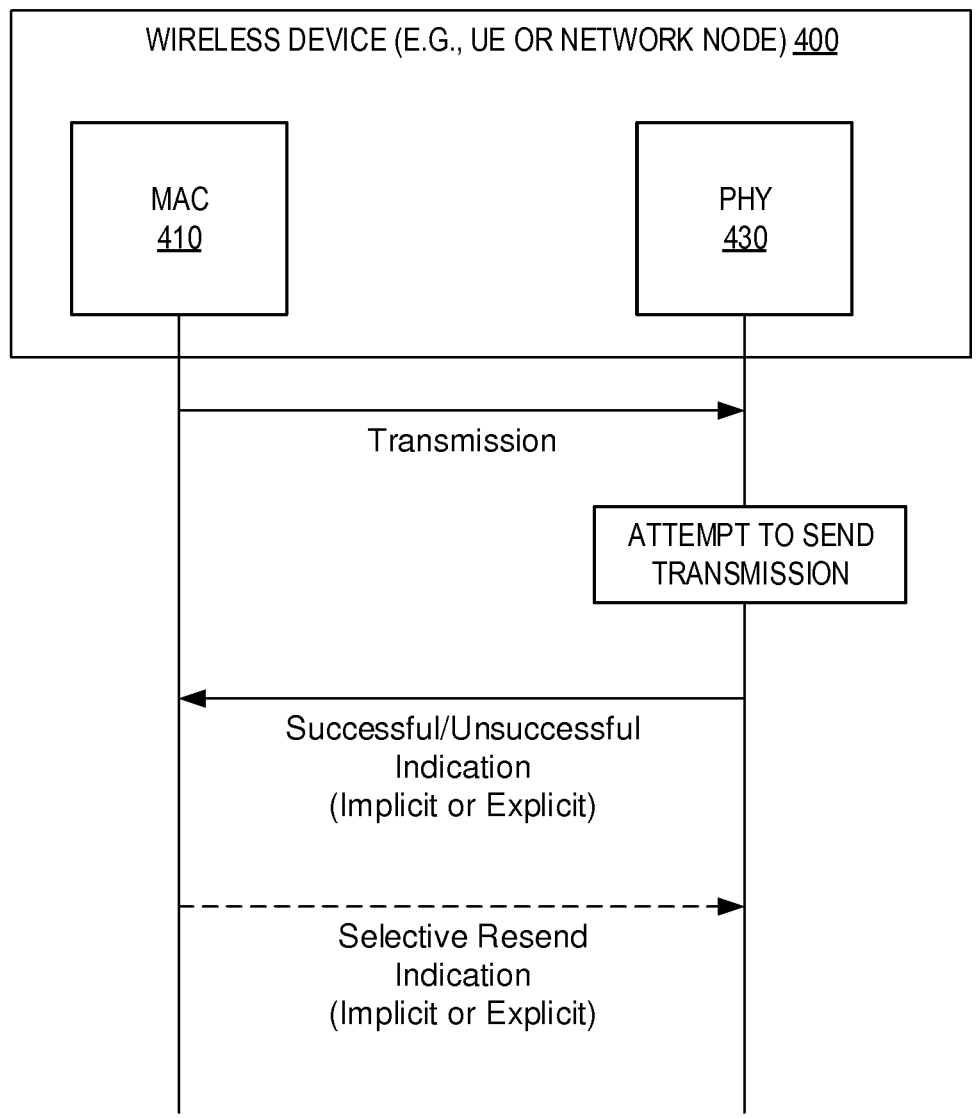
FIG. 9 shows an exemplary method as implemented by a wireless device comprising a MAC layer and a PHY layer.

FIG. 9 shows yet another embodiment from the perspective of a wireless device 400 having a MAC layer 410 and a PHY layer 430. As shown in FIG. 9, the MAC layer 410 delivers a transmission to the PHY layer 430. The PHY layer 430 attempts to send the transmission to a remote wireless communication device or node. Subsequently, the PHY layer 430 indicates to the MAC layer, implicitly or explicitly, whether the attempt to send the transmission by the PHY layer was successful. Responsive to the indication by the PHY layer 430 of whether the attempt to send the transmission by the PHY layer 430 was successful, the MAC layer 410 selectively indicates to the PHY layer 430, implicitly or explicitly, whether to attempt to resend the transmission.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Systems and methods are disclosed herein for the needed interaction between MAC layer and physical layer to handle retransmissions and associated procedures. Advantages of these systems and methods include efficient modeling of cross-layer interaction between MAC and physical layer to handle retransmissions in autonomous UL.

The below methods address the specific case of LAA, in which a transmission attempt from a UE at PHY layer may fail because of channel busy, i.e. LBT procedure not successful. However, they can be used for any scenarios in which, for any reason, transmission of a TB at the PHY layer on a given TTI fails because of different issues, e.g. failures in the radio unit, in-device coexistence issues (to high leakage between collocated radio transceivers in the same device), interruption time due to transceiver chain switching.

Methods for signaling LBT outcome from the MAC layer to the PHY layer include, in one embodiment, the PHY layer indicating to MAC the outcome of a transmission attempt related to the transmission of a certain transport block (TB) and/or HARQ process. If the LBT procedure is successful (channel sensed not busy) and the data are correctly transmitted over the air interface, the PHY layer sends to the MAC layer a positive acknowledge, otherwise a negative acknowledge is sent (channel sensed busy).

In another embodiment, it is considered the case in which only positive acknowledge are sent to the MAC layer from the PHY layer in the TTI in which the transmission was also supposed to be generated/performed over the air interface, e.g. the TTI in which the MAC layer delivered to the PHY layer the MAC PDU, or in a later TTI (not later than a certain value X from the TTI in in which the transmission was supposed to be generated/performed over the air interface). If no positive acknowledge received the MAC layer interprets the transmission of the concerned MAC PDU unsuccessful.

In another embodiment, only negative acknowledge are sent, in which case if following methods disclosed in previous embodiment no negative acknowledge is received, the MAC layer considers that the transmission was successfully generated/performed over the air interface for the concerned MAC PDU, i.e. LBT was successful for the concerned MAC PDU.

In another embodiment, before sending a negative or positive acknowledge, the PHY layer keeps attempting transmission of a MAC PDU delivered by MAC, until the LBT procedure is successful. This method implies that the MAC PDU is stored in the PHY while the radio interface is performing LBT. The MAC PDU is stored in PHY until positive acknowledge is sent to MAC, upon which the PHY may delete the stored MAC PDU.

MAC does not deliver further (re)transmissions to PHY until positive acknowledge from PHY is received (or negative acknowledge not received in time) for the MAC PDU delivered by a certain HARQ entity on a certain TTI, or until a certain maximum timer/counter (corresponding to amount of time or times for which the PHY attempted transmission of a MAC PDU) is reached, upon which PHY stops attempting transmission of this MAC PDU and MAC interprets it as negative acknowledge. For example, upon multiple failure of the LBT procedures, i.e. no positive acknowledge received in the time, the MAC may postpone the transmission of a MAC PDU to a later point in time and/or transmitting in another carrier.

In another embodiment, PHY does not explicitly signal an LBT failure. Instead, PHY treats LBT failure the same as if performing the transmission and receiving a negative ACK from the receiver that corresponds to failed decoding or missed transmission. Meaning that, upon LBT failure, the PHY generates a NACK that could have been received from the receiver and delivers it to MAC.

For content/triggering of PHY-MAC signaling, in one method, it is assumed that PHY attempts transmitting a transport block in the same TTI in which MAC delivered the MAC PDU to the PHY and also the outcome of the LBT, upon the attempted transmission, is signaled to MAC on the same TTI. Upon LBT, PHY indicates to MAC the carrier (e.g. cell index) on which it was attempted transmission, so that MAC associates the LBT outcome to the HARQ entity which is in charge of HARQ operation for the signaled carrier. Since the delivery of the MAC PDU to PHY and the report of the outcome of the LBT procedures occurs in the same TTI, the HARQ entity can associate the LBT outcome to the MAC PDU that the HARQ entity delivered to PHY in this TTI.

In another method, it is assumed that PHY attempts transmitting a transport block in a TTI, other than the TTI in which MAC delivered the MAC PDU to the PHY, or other than the outcome of the LBT, upon the attempted transmission, is signaled to MAC on another TTI. For example, PHY may signal the outcome of the LBT only after a certain timer upon a successful transmission expires. This would trigger MAC to generate a MAC PDU (either new or retransmission).

In this case, together with carrier, the PHY may also signal the TTI in which PHY attempted the transmission, or the TTI in which the transport block was successfully transmitted over the air interface, or the TTI in which a retransmission for this transport block should occur. The HARQ entity associated to this carrier may then retrieve the HARQ process which delivered to PHY the MAC PDU from the reported TTI.

In another method, it is assumed that MAC signals to PHY, along with the MAC PDU, the HARQ entity and/or the HARQ process associated to this MAC PDU and/or the TTI (or set of TTIs) in which transmission is allowed (or shall) occur, so that PHY can just signal back to MAC the HARQ entity and/or the HARQ process for the concerned TB for which transmission was attempted, possibly together with the TTI in which the transmission was attempted by PHY.

Different methods are disclosed in the following for further MAC/PHY actions for the two cases of positive and negative acknowledge.

In case of positive acknowledgement sent to MAC by the PHY, a plurality of actions is taken by the MAC layer and PHY.

MAC considers that a transmission has been generated for the MAC PDU delivered by the HARQ entity (which can be retrieved following methods disclosed in Section 0) for a certain HARQ process (which can be retrieved following methods disclosed in Section 0).

MAC may step the retransmission counter by one, since a transmission has been generated for the concerned MAC PDU.

MAC increment the current RVI.

MAC may initiate the UL HARQ RTT which in turn, at expiry, determines when the UE is supposed to receive an eNB feedback.

PHY may indicate for how long LBT was attempted and degree of interference perceived.

MAC initiates a retransmission timer which at expiry, may allow the UE to perform a retransmission for an HARQ process, if no HARQ feedback have been received before the retransmission timer expiry for this HARQ process.

PHY may consider the transport block successfully transmitted and delete the stored transport block from a local PHY buffer.

Some of the above actions may be instead taken by PHY, only when a transmission is really generated/performed over the air interface. For example, the PHY may trigger a timer when it manages to transmit a transport block over the air interface, and when this timer expires PHY tells MAC that another (re)transmission for a certain HARQ process (which can be retrieved following methods disclosed in Section 0) is allowed to be triggered, e.g. in the same TTI in which PHY signals to MAC that the timer has expired or at a later point in time.

In case of negative acknowledgement sent to MAC from PHY, a plurality of actions may be taken by the MAC layer and PHY.

MAC deliver a retransmission to PHY for the HARQ entity (which can be retrieved following methods disclosed in Section 0) in the concerned TTI (which can be retrieved following methods disclosed in Section 0), without performing some of the action listed in the section above, since the retransmission was not successful and no transport block was transmitted over the air interface, e.g. the MAC shall not:
Step the retransmission counter by one;
Increment the current RVI;
Initiate the UL HARQ RTT; and
Initiate a retransmission timer.

PHY may indicate for how long LBT was attempted and degree of interference perceived during the LBT procedure. PHY may also indicate for each PRBs (or set of PBRs, i.e. subchannels) the interference measured. MAC may then decide to postpone retransmission at a later point in time or perform retransmission on another carrier, or on the PRBs/subchannels in which the interference is lower as reported in PHY-to-MAC signalling.

MAC does not deliver a retransmission to PHY, but it just signals back to PHY when to retransmit the transport block containing the MAC PDU associated to the concerned HARQ entity. This case implies, that the PHY has kept the transport block stored in the PHY layer waiting for a retransmission trigger from MAC. As part of this signalling, MAC may indicate the III, and the PRBs in which the transport block should be retransmitted by PHY.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)), etc. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 960 includes processing circuitry 970, device readable medium 980, interface 990, auxiliary equipment 984, power source 986, power circuitry 987, and antenna 962. Although network node 960 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signaling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 10 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. . . . A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 910.

Antenna 911 is connected to interface 914, and may include one or more antennas, or antenna arrays, configured to send and/or receive wireless signals. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprises one or more filters 918 and amplifiers 99. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 996. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 11:
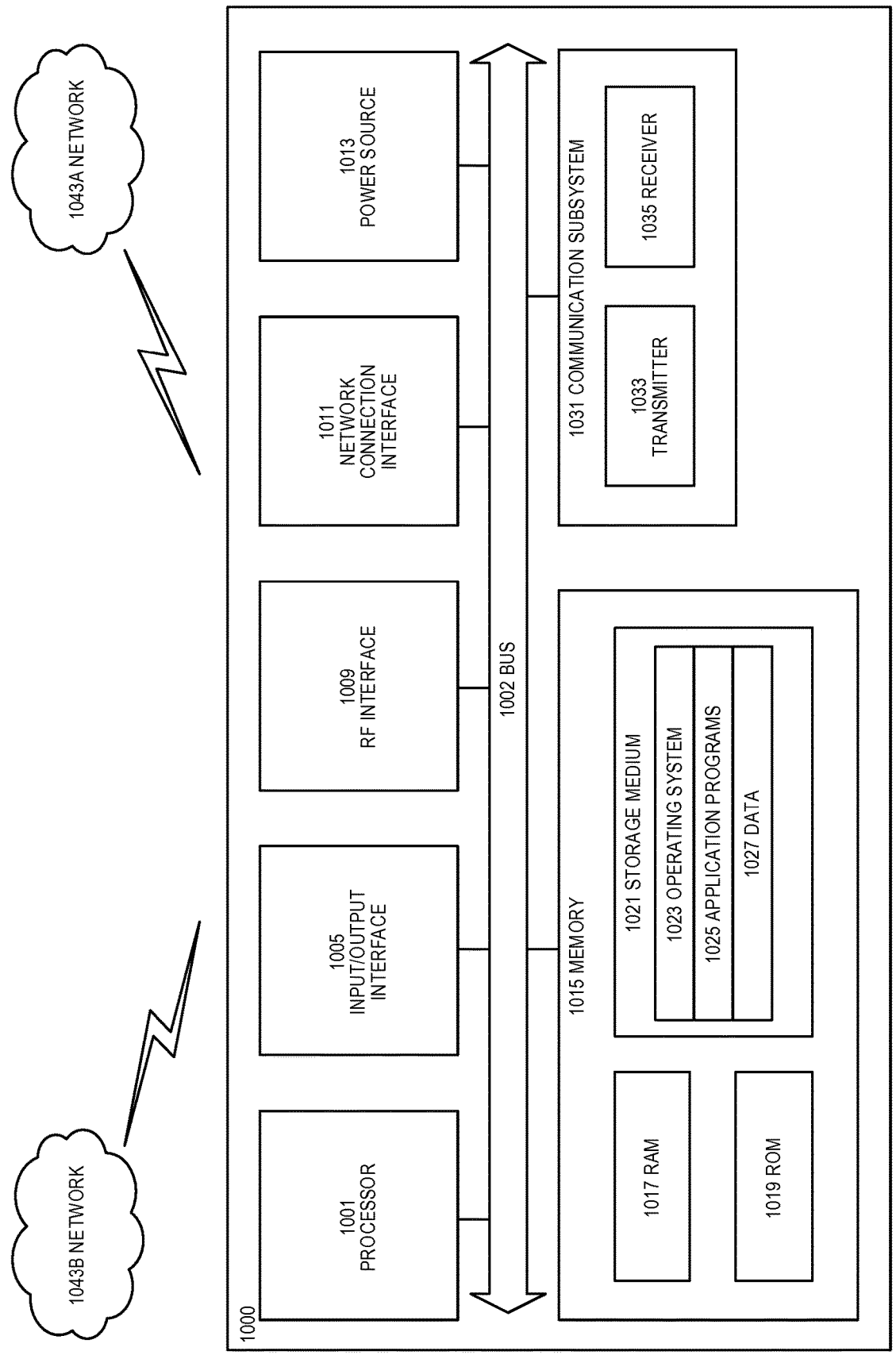
FIG. 11 shows an exemplary UE applicable to the solution presented herein.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1020 may be any UE identified by the 3rd Generation Partnership Project (3GPP), including a NB-IoT UE, a machine type communication (MTC) UE, and/or an enhanced MTC (eMTC) UE. UE 1000, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 1000 includes processing circuitry 1001 that is operatively coupled to input/output interface 1005, radio frequency (RF) interface 1009, network connection interface 1011, memory 1015 including random access memory (RAM) 1010, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1009 may be configured to provide a communication interface to RF components such as a transmitter, a receiver, and an antenna. Network connection interface 1011 may be configured to provide a communication interface to network 1043*a*. Network 1043*a* may encompass wired and/or wireless networks such as a local-area network (LAN), a wide-area network (WAN), a computer network, a wireless network, a telecommunications network, another like network or any combination thereof. For example, network 1043*a* may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1010 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 11, processing circuitry 1001 may be configured to communicate with network 1043*b* using communication subsystem 1031. Network 1043*a* and network 1043*b* may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 12:
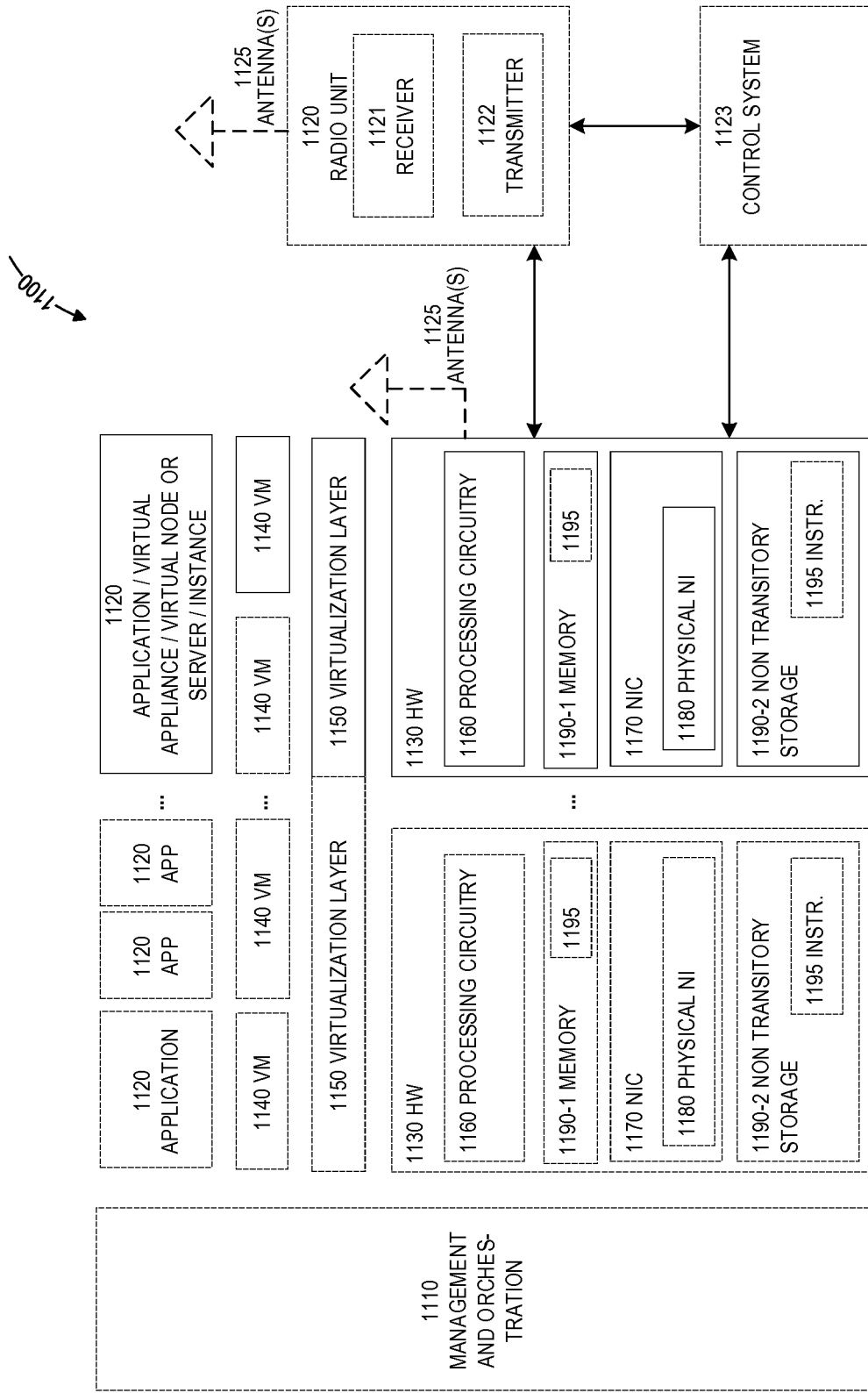
FIG. 12 shows an exemplary virtualization environment applicable to the solution presented herein.

FIG. 12 is a schematic block diagram illustrating a virtualization environment 1100 in which functions implemented by some embodiments may be virtualized. In the present context, virtualizing means creating virtual versions of apparatuses or devices, which may include virtualizing hardware platforms, storage devices, and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 12, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 1110, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 12.

In some embodiments, one or more radio units 1120 that each include one or more transmitters 1122 and one or more receivers 1121 may be coupled to one or more antennas 1125. Radio units 1120 may communicate directly with hardware nodes 1130 via one or more appropriate network interfaces and may be used in combination with the virtual components to provide a virtual node with radio capabilities, such as a radio access node or a base station.

In some embodiments, some signaling can be effected with the use of control system 1123 which may alternatively be used for communication between the hardware nodes 1130 and radio units 1120.

Figure 13:
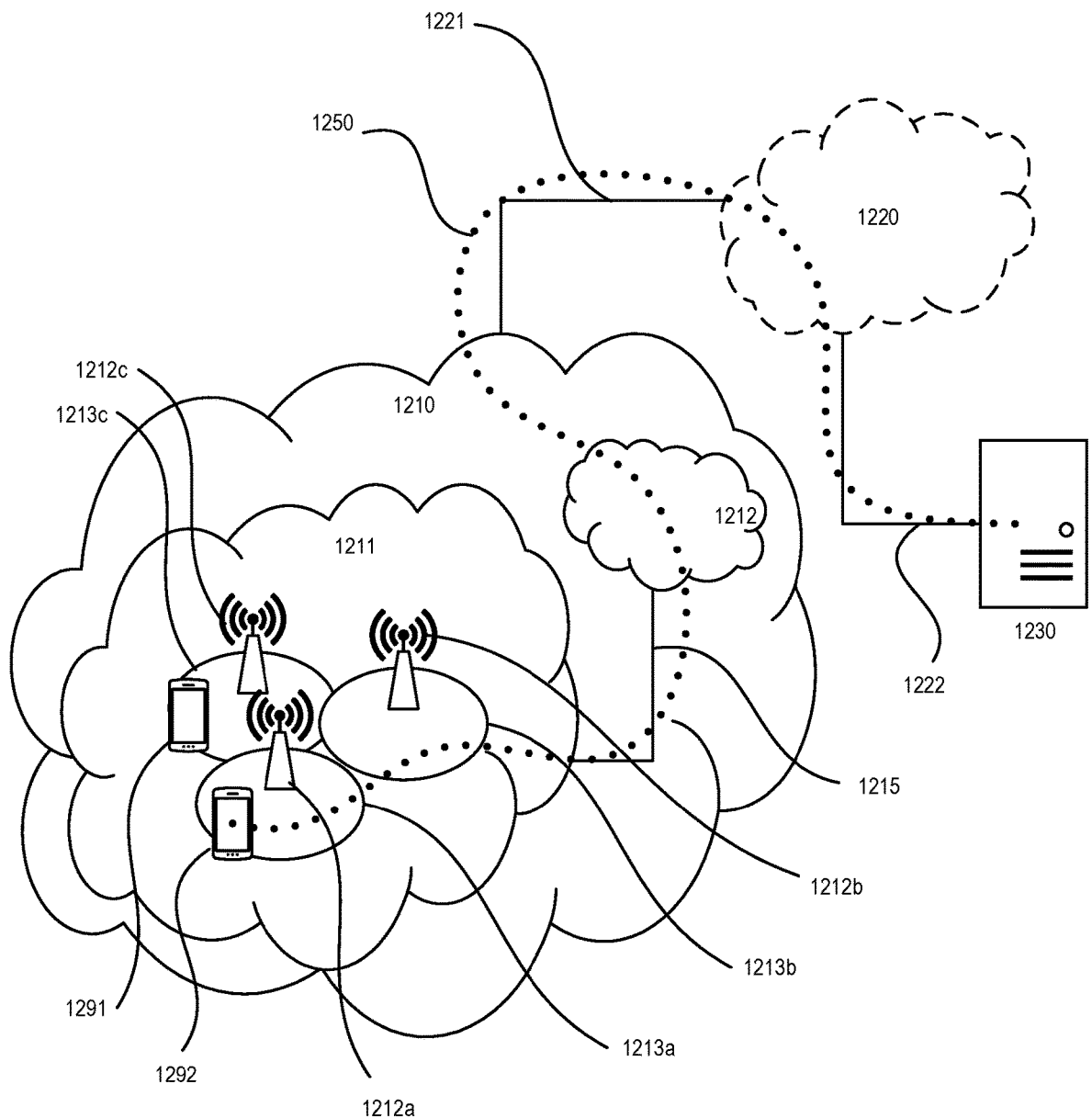
FIG. 13 shows an exemplary telecommunications network applicable to the solution presented herein.

FIG. 13 illustrates a telecommunication network connected via an intermediate network to a host computer in accordance with some embodiments. In particular, with reference to FIG. 13, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 13 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 14:
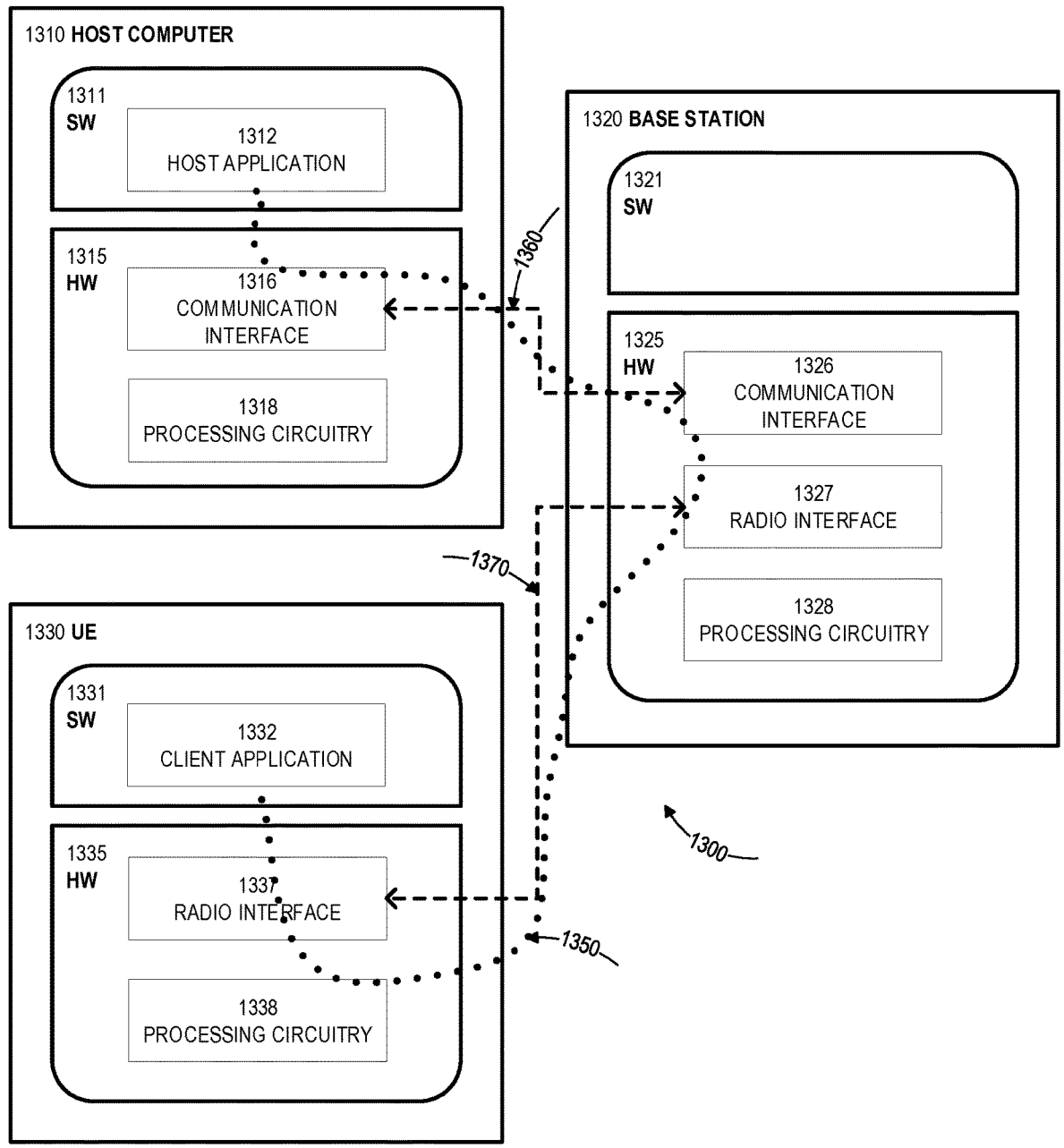
FIG. 14 shows an exemplary host computer applicable to the solution presented herein.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 14) served by base station 1320. Communication interface 1326 may be configured to facilitate connection 1360 to host computer 1310. Connection 1360 may be direct or it may pass through a core network (not shown in FIG. 14) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 14 may be similar or identical to host computer 1330, one of base stations 1312a, 1312b, 1312c and one of UEs 1391, 1392 of FIG. 14, respectively. This is to say, the inner workings of these entities may be as shown in FIG. 14 and independently, the surrounding network topology may be that of FIG. 14.

In FIG. 14, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 15:
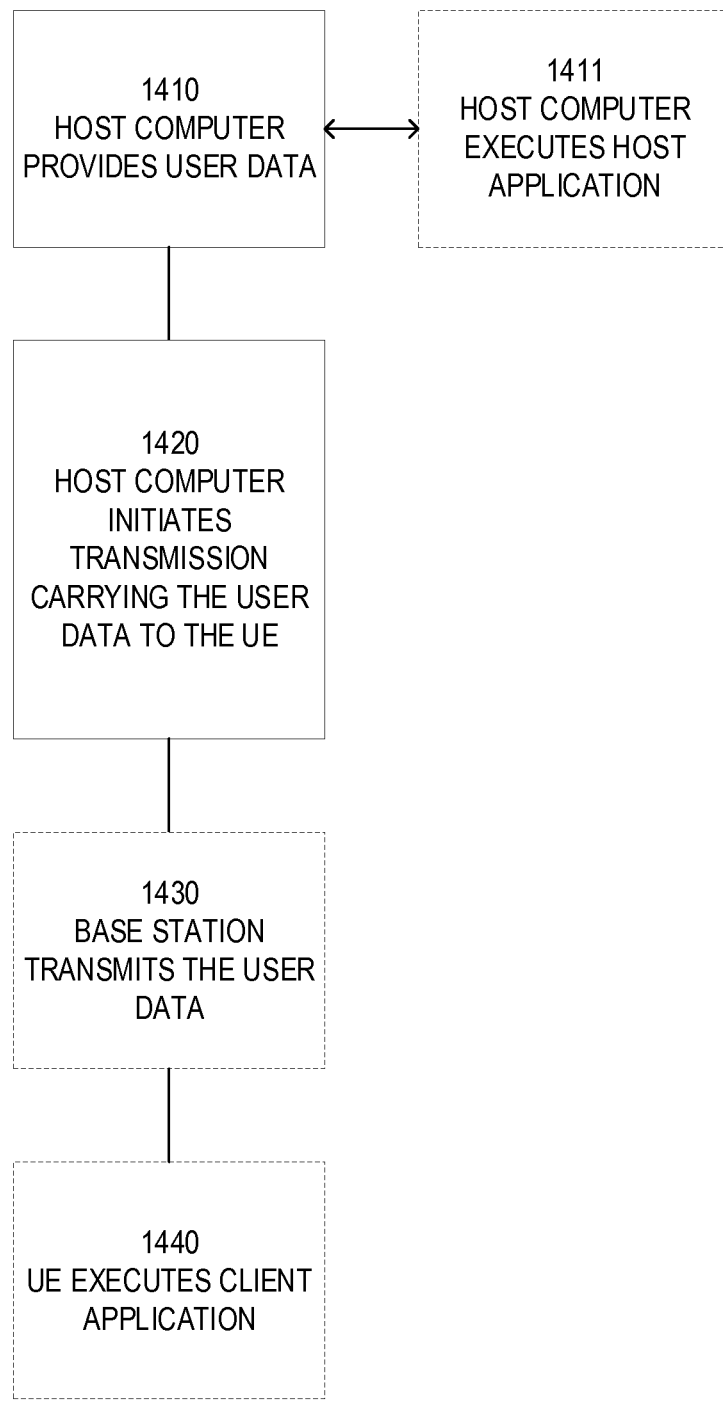
FIG. 15 shows an exemplary method implemented in a communication system in accordance with embodiments of the solution presented herein.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 16:
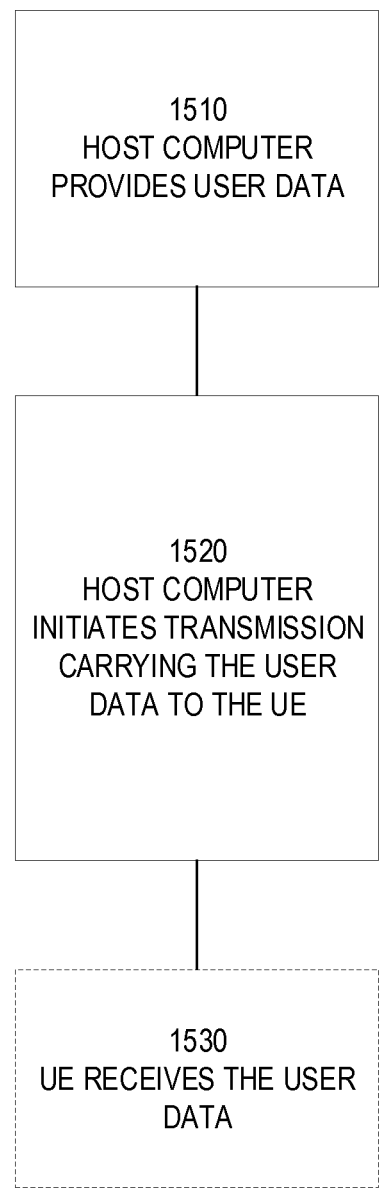
FIG. 16 shows another exemplary method implemented in a communication system in accordance with embodiments of the solution presented herein.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 17:
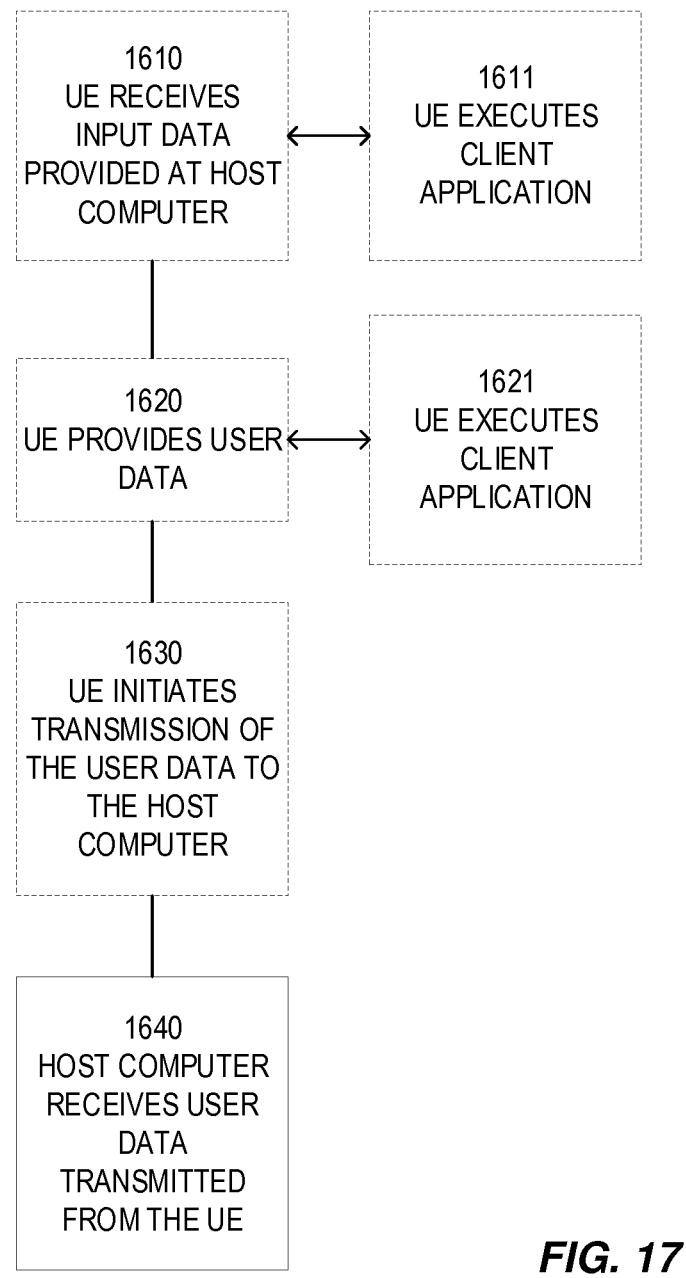
FIG. 17 shows another exemplary method implemented in a communication system in accordance with embodiments of the solution presented herein.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 18:
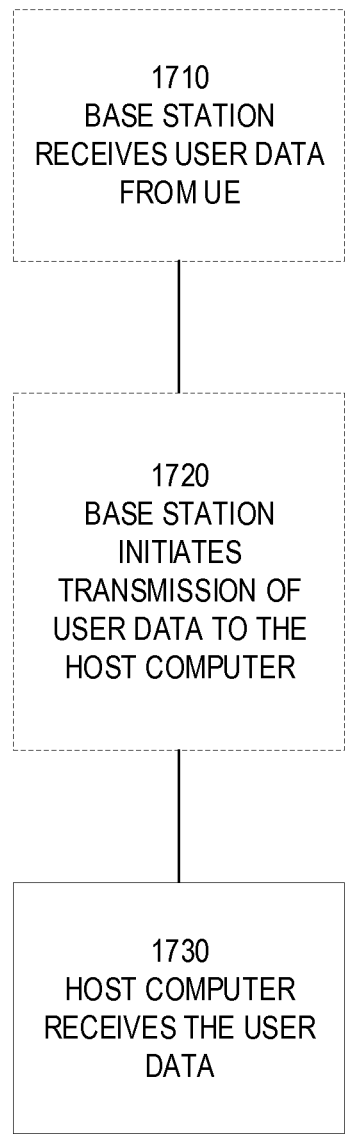
FIG. 18 shows another exemplary method implemented in a communication system in accordance with embodiments of the solution presented herein.

FIG. 18 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 18 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following details various embodiments for the solution presented herein.

Group A Embodiments

1. A method performed by a wireless device having a medium access control (MAC) layer and a physical layer, the method comprising explicitly or implicitly signaling, by the physical layer, to the MAC layer, whether the physical layer transmitted data that the MAC layer sent to the physical layer for transmission during a certain transmission time interval (TTI).

2A. The method of embodiment 1, further comprising attempting, by the physical layer, transmission of the data during the certain TTI.

2B. The method of any of embodiments 1-2A, wherein said signaling includes sending or determining not to send, by the physical layer, to the MAC layer, an indication of whether a transmission attempt of the data is successful or unsuccessful.

2C. The method of embodiment 2B, wherein the attempted transmission is over unlicensed spectrum that requires the unlicensed spectrum for that transmission attempt to be available before transmission of data, responsive to a request by the MAC layer for that transmission attempt, wherein the wireless device is operable to communicate with a first cell over licensed spectrum and with a second cell over the unlicensed spectrum that requires a listen-before-talk (LBT) procedure.

2D. The method of any of embodiments 1-2C, further comprising determining, by the physical layer, whether a transmission attempt of the data is successful or unsuccessful.

3. The method of embodiment 2D, wherein said determining whether that transmission attempt is successful or unsuccessful includes determining whether unlicensed spectrum for that transmission attempt is available or unavailable.

4. The method of any of embodiments 2D-3, wherein said determining whether the transmission attempt is successful or unsuccessful includes determining whether a transmission by the wireless device for that transmission attempt occurred or did not occur.

5. The method of any of embodiments 2B-4, wherein said sending includes in response to determining that that transmission attempt was successful, sending, by the physical layer, to the MAC layer, an indication that the transmission attempt was successful.

6. The method of any of embodiments 2B-4, wherein said determining not to send includes in response to determining that that transmission attempt was successful, determining not to send to the MAC layer an indication that the transmission attempt was successful.

7. The method of any of embodiments 2B-6, wherein said sending includes in response to determining that that transmission attempt was unsuccessful, sending, by the physical layer, to the MAC layer, an indication that the transmission attempt was unsuccessful.

8. The method of any of embodiments 2B-6, wherein said determining not to send includes in response to determining that that transmission attempt was unsuccessful, determining not to send to the MAC layer an indication that the transmission attempt was unsuccessful.

9. The method of any of embodiments 1-8, wherein the certain TTI corresponds to a TTI during which the MAC layer delivered the data to the physical layer for that transmission attempt.

10. The method of any of embodiments 1-8, wherein the certain TTI corresponds to a next TTI after a TTI during which the MAC layer delivered the data to the physical layer for that transmission attempt.

11. The method of any of embodiments 1-10, wherein the data is related to a transport block (TB) or a hybrid automatic repeat request (HARQ) process.

12. The method of any of embodiments 2A-11, wherein said attempting is responsive to determining that unlicensed spectrum for that transmission attempt is available.

13. The method of any of embodiments 1-12, further comprising storing, by the physical layer in memory, the data responsive to receiving, from the MAC layer, the data.

14. The method of embodiment 13, further comprising deleting or allowing deletion of, by the physical layer from memory, the data responsive to determining that the transmission attempt is successful.

15. The method of any of embodiments 1-14, wherein said signaling indicates a negative acknowledgement (NACK) having a format equivalent to a format of a NACK message transmitted by a network node that indicates decode failure or missed transmission of the data.

16. The method of any of embodiments 1-15, wherein the data is a protocol data unit (PDU).

17. The method of any of embodiments 1-16, wherein said signaling that the data was not transmitted by the physical layer is due to at least one of the following unlicensed spectrum is not available for the transmission of the data, wherein the wireless device is operable to communicate with a first cell over licensed spectrum and with a second cell over the unlicensed spectrum that requires a listen-before-talk (LBT) procedure; a failure detected in a communication unit of the wireless device; a co-existence issue between transceivers in the communication unit; and an interruption time due to switching between the transceivers.

18. The method of any of embodiments 1-17, wherein the certain TTI corresponds to a TTI during which the MAC layer delivered the data to the physical layer for that transmission attempt; and wherein said signaling is performed during the certain TTI.

19. The method of any of embodiments 1-18, further comprising receiving, by the physical layer, from the MAC layer, an indication of a cell associated with the transmission of the data.

20. The method of any of embodiments 1-19, further comprising sending, by the physical layer, to the MAC layer, an indication of a cell associated with the transmission of the data, the receipt of which implicitly signals to the MAC layer an attempted transmission of the data by the physical layer.

21. The method of embodiment 20, wherein said sending the indication of the cell is performed during the certain TTI.

22. The method of embodiment 20, wherein said sending the indication of the cell is performed during a TTI that is different from a TTI in which the MAC layer delivered the data.

23. The method of any of embodiments 1-22, further comprising receiving, by the physical layer, from the MAC layer, an indication of a hybrid automatic repeat request (HARQ) entity or process associated with the data or the certain TTI; and wherein said signaling includes sending an indication of the HARQ entity or process or the certain TTI so as to implicitly signals an attempt by the physical layer to transmit the data.

24. The method of any of embodiments 1-23, further comprising receiving, by the physical layer, from the MAC layer, a request to transmit the data during the certain TTI.

Group B Embodiments

31. A method performed by a wireless device having a medium access control (MAC) layer and a physical layer, the method comprising receiving or determining, by the MAC layer, explicit or implicit signaling by the physical layer of whether the physical layer transmitted data that the MAC layer sent to the physical layer for transmission during a certain transmission time interval (TTI).

32A. The method of embodiment 31, further comprising sending, by the MAC layer, to the physical layer, a request to transmit the data during the certain TTI.

32B. The method of embodiment 32A, wherein the requested transmission of the data is in unlicensed spectrum that requires the unlicensed spectrum for a transmission attempt to be available before transmission of the data, wherein the wireless device is operable to communicate with a first cell over licensed spectrum and with a second cell over the unlicensed spectrum that requires a listen-before-talk (LBT) procedure.

32C. The method of any of embodiments 31-32B, wherein said receiving or determining includes receiving or determining that the MAC layer has not received, from the physical layer, an indication of whether a transmission attempt was successful or unsuccessful.

33. The method of embodiment 32C, wherein said receiving includes receiving, by the MAC layer, from the physical layer, an indication that that transmission attempt was successful.

34. The method of embodiment 32C, wherein said determining that the MAC layer has not received the indication which implicitly signals that that transmission attempt was unsuccessful.

35. The method of any of embodiments 32C-34, wherein said receiving includes receiving, by the MAC layer, from the physical layer, an indication that that transmission attempt was unsuccessful.

36. The method of any of embodiments 32C-34, wherein said determining that the MAC layer has not received the indication which implicitly signals that that transmission attempt was successful.

37. The method of any of embodiments 32C-36, further comprising determining whether to request to transmit the data by the physical layer during the certain TTI.

38. The method of any of embodiments 31-37, wherein the certain TTI corresponds to a TTI during which the MAC layer delivered the data to the physical layer for that transmission attempt.

39. The method of any of embodiments 31-37, wherein the certain TTI corresponds to a next TTI after a TTI during which the MAC layer delivered the data to the physical layer for that transmission attempt.

40. The method of any of embodiments 31-39, wherein the data is related to a transport block (TB) or a hybrid automatic repeat request (HARQ) process.

41. The method of any of embodiments 31-40, wherein the indication is a negative acknowledgement (NACK) having a format equivalent to a format of a NACK transmitted by a network node that indicates decode failure or missed transmission of the data.

The method of any of embodiments 31-41, wherein the data is a protocol data unit (PDU).

43. The method of any of embodiments 31-42, wherein said receiving or determining the explicit or implicit signaling that the data was not transmitted by the physical layer is due to at least one of the following unlicensed spectrum is not available for the transmission of the data, wherein the wireless device is operable to communicate with a first cell over licensed spectrum and with a second cell over the unlicensed spectrum that requires a listen-before-talk (LBT) procedure; a failure detected in a communication unit of the wireless device; a co-existence issue between transceivers in the communication unit; and an interruption time due to switching between the transceivers.

44. The method of any of embodiments 31-43, wherein the certain TTI corresponds to a TTI during which the MAC layer delivered the data to the physical layer for that transmission attempt; and wherein said signaling is performed during the certain TTI.

45. The method of any of embodiments 31-44, further comprising sending, by the MAC layer, to the physical layer, an indication of a cell associated with the transmission of the data.

46. The method of embodiment 45, wherein said sending the indication of the cell is performed during the certain TTI.

47. The method of embodiment 45, wherein said sending the indication of the cell is performed during a TTI that is different from a TTI in which the MAC layer delivered the data.

48. The method of any of embodiments 31-47, further comprising sending, by the MAC layer, to the physical layer, an indication of a hybrid automatic repeat request (HARQ) entity or process associated with the data or the certain TTI; and wherein said receiving includes receiving an indication of the HARQ entity or process or the certain TTI so as to implicitly signals an attempt by the physical layer to transmit the data.

49. The method of any of embodiments 31-48, further comprising delivering, by the MAC layer, to the physical layer, the data.

50. The method of any of embodiments 31-49, further comprising receiving, by the MAC layer, from the physical layer, an indication of a cell associated with the transmission of the data, the receipt of which implicitly signals to the MAC layer an attempted transmission of the data by the physical layer.

Group C Embodiments

C1. A wireless device configured to perform any of the steps of any of the Group A embodiments.

C2. A wireless device comprising processing circuitry configured to perform any of the steps of any of the Group A embodiments; and power supply circuitry configured to supply power to the wireless device.

C3. A wireless device comprising processing circuitry and memory, the memory containing instructions executable by the processing circuitry whereby the wireless device is configured to perform any of the steps of any of the Group A embodiments.

C4. A user equipment (UE) comprising an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

C5. A computer program comprising instructions which, when executed by at least one processor of a wireless device, causes the wireless device to carry out the steps of any of the Group A embodiments.

C6. A carrier containing the computer program of embodiment C5, wherein the carrier is one of an electronic signal, optical signal, radio signal, or computer readable storage medium.

C7. A wireless device configured to perform any of the steps of any of the Group B embodiments.

C8. A wireless device comprising processing circuitry configured to perform any of the steps of any of the Group B embodiments; power supply circuitry configured to supply power to the wireless device.

C9. A wireless device comprising processing circuitry and memory, the memory containing instructions executable by the processing circuitry whereby the wireless device is configured to perform any of the steps of any of the Group B embodiments.

C10. A computer program comprising instructions which, when executed by at least one processor of a wireless device, causes the wireless device to carry out the steps of any of the Group B embodiments.

C11. A carrier containing the computer program of embodiment C10, wherein the carrier is one of an electronic signal, optical signal, radio signal, or computer readable storage medium.

Group D Embodiments

D1. A communication system including a host computer comprising processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

D2. The communication system of the previous embodiment, wherein the cellular network further includes a base station configured to communicate with the UE.

D3. The communication system of the previous 2 embodiments, wherein the processing circuitry of the host computer is configured to execute a host application, thereby providing the user data; and the UE's processing circuitry is configured to execute a client application associated with the host application.

D4. A method implemented in a communication system including a host computer, a base station and a user equipment (UE), the method comprising at the host computer, providing user data; and at the host computer, initiating a transmission carrying the user data to the UE via a cellular network comprising the base station, wherein the UE performs any of the steps of any of the Group A embodiments.

D5. The method of the previous embodiment, further comprising at the UE, receiving the user data from the base station.

D6. A communication system including a host computer comprising communication interface configured to receive user data originating from a transmission from a user equipment (UE) to a base station, wherein the UE comprises a radio interface and processing circuitry, the UE's processing circuitry configured to perform any of the steps of any of the Group A embodiments.

D7. The communication system of the previous embodiment, further including the UE.

D8. The communication system of the previous 2 embodiments, further including the base station, wherein the base station comprises a radio interface configured to communicate with the UE and a communication interface configured to forward to the host computer the user data carried by a transmission from the UE to the base station.

D9. The communication system of the previous 3 embodiments, wherein the processing circuitry of the host computer is configured to execute a host application; and the UE's processing circuitry is configured to execute a client application associated with the host application, thereby providing the user data.

D10. The communication system of the previous 4 embodiments, wherein the processing circuitry of the host computer is configured to execute a host application, thereby providing request data; and the UE's processing circuitry is configured to execute a client application associated with the host application, thereby providing the user data in response to the request data.

D11. A method implemented in a communication system including a host computer, a base station and a user equipment (UE), the method comprising at the host computer, receiving user data transmitted to the base station from the UE, wherein the UE performs any of the steps of any of the Group A embodiments.

D12. The method of the previous embodiment, further comprising, at the UE, providing the user data to the base station.

D13. The method of the previous 2 embodiments, further comprising at the UE, executing a client application, thereby providing the user data to be transmitted; and at the host computer, executing a host application associated with the client application.

D14. The method of the previous 3 embodiments, further comprising at the UE, executing a client application; and at the UE, receiving input data to the client application, the input data being provided at the host computer by executing a host application associated with the client application, wherein the user data to be transmitted is provided by the client application in response to the input data.

D15. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D16. The communication system of the previous embodiment further including the base station.

D17. The communication system of the previous 2 embodiments, further including the UE, wherein the UE is configured to communicate with the base station.

D18. The communication system of the previous 3 embodiments, wherein the processing circuitry of the host computer is configured to execute a host application; the UE is configured to execute a client application associated with the host application, thereby providing the user data to be received by the host computer.

D19. A method implemented in a communication system including a host computer, a base station and a user equipment (UE), the method comprising at the host computer, receiving, from the base station, user data originating from a transmission which the base station has received from the UE, wherein the UE performs any of the steps of any of the Group A embodiments.

D20. The method of the previous embodiment, further comprising at the base station, receiving the user data from the UE.

D21. The method of the previous 2 embodiments, further comprising at the base station, initiating a transmission of the received user data to the host computer.

D22. A communication system including a host computer comprising processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group B embodiments.

D23. The communication system of the previous embodiment, wherein the cellular network further includes a base station configured to communicate with the UE.

D24. The communication system of the previous 2 embodiments, wherein the processing circuitry of the host computer is configured to execute a host application, thereby providing the user data; and the UE's processing circuitry is configured to execute a client application associated with the host application.

D25. A method implemented in a communication system including a host computer, a base station and a user equipment (UE), the method comprising at the host computer, providing user data; and at the host computer, initiating a transmission carrying the user data to the UE via a cellular network comprising the base station, wherein the UE performs any of the steps of any of the Group B embodiments.

D26. The method of the previous embodiment, further comprising at the UE, receiving the user data from the base station.

D27. A communication system including a host computer comprising communication interface configured to receive user data originating from a transmission from a user equipment (UE) to a base station, wherein the UE comprises a radio interface and processing circuitry, the UE's processing circuitry configured to perform any of the steps of any of the Group B embodiments.

D28. The communication system of the previous embodiment, further including the UE.

D29. The communication system of the previous 2 embodiments, further including the base station, wherein the base station comprises a radio interface configured to communicate with the UE and a communication interface configured to forward to the host computer the user data carried by a transmission from the UE to the base station.

D30. The communication system of the previous 3 embodiments, wherein the processing circuitry of the host computer is configured to execute a host application; and the UE's processing circuitry is configured to execute a client application associated with the host application, thereby providing the user data.

D31. The communication system of the previous 4 embodiments, wherein the processing circuitry of the host computer is configured to execute a host application, thereby providing request data; and the UE's processing circuitry is configured to execute a client application associated with the host application, thereby providing the user data in response to the request data.

D32. A method implemented in a communication system including a host computer, a base station and a user equipment (UE), the method comprising at the host computer, receiving user data transmitted to the base station from the UE, wherein the UE performs any of the steps of any of the Group B embodiments.

D33. The method of the previous embodiment, further comprising, at the UE, providing the user data to the base station.

D34. The method of the previous 2 embodiments, further comprising at the UE, executing a client application, thereby providing the user data to be transmitted; and at the host computer, executing a host application associated with the client application.

D35. The method of the previous 3 embodiments, further comprising at the UE, executing a client application; and at the UE, receiving input data to the client application, the input data being provided at the host computer by executing a host application associated with the client application, wherein the user data to be transmitted is provided by the client application in response to the input data.

D36. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

D37. The communication system of the previous embodiment further including the base station.

D38. The communication system of the previous 2 embodiments, further including the UE, wherein the UE is configured to communicate with the base station.

D39. The communication system of the previous 3 embodiments, wherein the processing circuitry of the host computer is configured to execute a host application; the UE is configured to execute a client application associated with the host application, thereby providing the user data to be received by the host computer.

D40. A method implemented in a communication system including a host computer, a base station and a user equipment (UE), the method comprising at the host computer, receiving, from the base station, user data originating from a transmission which the base station has received from the UE, wherein the UE performs any of the steps of any of the Group B embodiments.

D41. The method of the previous embodiment, further comprising at the base station, receiving the user data from the UE.

D42. The method of the previous 2 embodiments, further comprising at the base station, initiating a transmission of the received user data to the host computer.

The solution presented herein may, of course, be carried out in other ways than those specifically set forth herein without departing from essential characteristics of the disclosed solution. The present embodiments are to be considered in all respects as illustrative and not restrictive, and all changes coming within the meaning and equivalency range of the appended claims are intended to be embraced therein.

What is claimed is:

1. A method performed by a wireless communication device or node having a Medium Access Control (MAC) layer and a physical (PHY) layer, the method implemented by the PHY layer and comprising:
   receiving a transmission from the MAC layer during a certain transmission time interval (TTI);
   attempting to send the transmission to a remote wireless communication device or node during the certain TTI or a later TTI after the certain TTI; and
   responsive to the attempt being unsuccessful, indicating to the MAC layer that the attempt was unsuccessful by sending the MAC layer an indication of a cell associated with the transmission.

2. The method of claim 1 wherein attempting to send the transmission to the remote wireless communication device or node comprises attempting to send the transmission to a network node of a cellular network and wherein the cell is associated with the network node of the cellular network.

3. The method of claim 1 wherein said attempting to send the transmission comprises making one or more attempts within a window defined by the certain TTI and the later TTI, and wherein the later TTI is a next TTI or is not later than a certain number of TTIs after the certain TTI, and wherein said indicating to the MAC layer comprises sending the indication for each unsuccessful attempt made during the window or sending the indication responsive to a last attempt within the window being unsuccessful.

4. The method of claim 1, wherein the method further comprises, responsive to the attempt being successful, implicitly indicating the success to the MAC layer by not sending the indication of the cell associated with the transmission.

5. The method of claim 1, wherein:
   the wireless communication device or node is operable to communicate with a first cell over licensed spectrum and with a second cell over unlicensed spectrum that requires a determination of whether the unlicensed spectrum is available before attempting to send the transmission; and
   said attempting to send the transmission comprises attempting to send the transmission over the unlicensed spectrum.

6. The method of claim 5, wherein said attempting to send the transmission over the unlicensed spectrum comprises performing a Listen Before Talk (LBT) procedure one or more times with respect to the unlicensed spectrum and not sending the transmission responsive to the LBT procedure indicating that the unlicensed spectrum is not available for sending the transmission.

7. The method of claim 1, wherein the transmission is related to a Transport Block (TB) or a Hybrid Automatic Repeat reQuest (HARQ) process.

8. The method of claim 1, wherein the transmission comprises a Protocol Data Unit (PDU).

9. A wireless communication device or node comprising:
   processing circuitry configured as a Medium Access Control (MAC) layer and a physical (PHY) layer operatively connected to the MAC layer, and wherein the PHY layer is configured to:
   receive a transmission from the MAC layer during a certain transmission time interval (TTI);
   attempt to send the transmission to a remote wireless communication device or node during the certain TTI or a later TTI after the certain TTI; and
   responsive to the attempt being unsuccessful, indicate to the MAC layer that the attempt was unsuccessful by sending the MAC layer an indication of a cell associated with the transmission; and
   power supply circuitry configured to supply power to the wireless communication device or node.

10. The wireless communication device or node of claim 9, wherein the remote wireless communication device or node comprises a network node of a cellular network, the network node being associated with the cell, and wherein the wireless communication device or node comprises a user equipment configured to attempt to send the transmission to the network node in the cellular network.

11. The wireless communication device or node of claim 9, wherein the PHY layer is configured to not send the indication of the cell associated with the transmission to the MAC layer in response to the attempt being successful, wherein not sending the indication serves as an implicit indication to the MAC layer that the attempt was successful.

12. A method performed by a wireless communication device or node having a Medium Access Control (MAC) layer and a physical (PHY) layer, the method implemented by the MAC layer and comprising:
   delivering a transmission, during a certain transmission time interval (TTI) to the PHY layer for sending to a remote wireless communication device or node;
   determining whether an attempt to send, during the certain TTI or a later TTI after the certain TTI, the transmission by the PHY layer was successful, according to whether an indication of a cell associated with the transmission is received from the PHY layer, the MAC layer interpreting receipt of such indication from the PHY layer as an indication that the attempt was unsuccessful and interpreting non-receipt of such indication from the PHY layer as an implicit indication that the attempt was successful; and
   selectively indicating to the PHY layer whether to attempt to resend the transmission responsive to the determination of whether the attempt to send the transmission by the PHY layer was successful.

13. The method of claim 12 wherein the remote wireless communication device or node comprises a network node of a cellular network, the cell being associated with the network node, and wherein the wireless communication device or node comprises a user equipment configured to attempt to send the transmission to the network node in the cellular network.

14. The method of claim 12, wherein the transmission is related to a Transport Block (TB) or a Hybrid Automatic Repeat reQuest (HARQ) process.

15. The method of claim 12, wherein the transmission is a Protocol Data Unit (PDU).

16. The method of claim 12, wherein said selectively indicating to the PHY layer comprises redelivering the transmission to the PHY layer for resending to the remote wireless communication device or node responsive to determining that the attempt to send the transmission by the PHY layer was unsuccessful.

17. The method of claim 12, wherein said selectively indicating to the PHY layer comprises signaling to the PHY layer to attempt to resend the transmission to the remote wireless communication device or node responsive to determining that the attempt to send the transmission by the PHY layer was unsuccessful.

18. A wireless communication device or node comprising:
processing circuitry configured as Medium Access Control (MAC) layer and a physical (PHY) layer operatively connected to the MAC layer, wherein the MAC layer is configured to:
- deliver a transmission, during a certain transmission time interval (TTI) to the PHY layer for sending to a remote wireless communication device or node;
- determine whether an attempt to send, during the certain TTI or a later TTI after the certain TTI, the transmission by the PHY layer was successful, according to whether an indication of a cell associated with the transmission is received from the PHY layer, the MAC layer interpreting receipt of such indication from the PHY layer as an indication that the attempt was unsuccessful and interpreting non-receipt of such indication from the PHY layer as an implicit indication that the attempt was successful; and
- selectively indicate to the PHY layer whether to attempt to resend the transmission responsive to the determination of whether the attempt to send the transmission by the PHY layer was successful; and power supply circuitry configured to supply power to the wireless communication device or node.

19. The wireless communication device or node of claim 18, wherein the remote wireless communication device or node comprises a network node in a cellular network, and wherein the wireless communication device or node comprises a user equipment configured to attempt to send the transmission to the network node in the cellular network.

* * * * *